(12) United States Patent
Verma et al.

(10) Patent No.: US 12,265,546 B2
(45) Date of Patent: Apr. 1, 2025

(54) SYSTEM AND METHOD FOR AUTOMATIC GENERATION OF BI MODELS USING DATA INTROSPECTION AND CURATION

(71) Applicant: ORACLE INTERNATIONAL CORPORATION, Redwood Shores, CA (US)

(72) Inventors: Saurabh Verma, Cupertino, CA (US); Balaji Krishnan, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/180,385

(22) Filed: Feb. 19, 2021

(65) Prior Publication Data
US 2021/0173846 A1 Jun. 10, 2021

Related U.S. Application Data

(63) Continuation-in-part of application No. 16/868,081, filed on May 6, 2020.
(Continued)

(51) Int. Cl.
*G06F 16/25* (2019.01)
*G06F 16/2458* (2019.01)
(Continued)

(52) U.S. Cl.
CPC ........ *G06F 16/254* (2019.01); *G06F 16/2465* (2019.01); *G06F 16/258* (2019.01); *G06F 16/283* (2019.01); *G06N 5/022* (2013.01)

(58) Field of Classification Search
CPC .. G06F 16/254; G06F 16/2465; G06F 16/258; G06F 16/283
See application file for complete search history.

(56) References Cited

U.S. PATENT DOCUMENTS 6,189,004 B1 * 2/2001 Rassen ............... G06F 16/2423
707/999.102
9,075,860 B2 * 7/2015 Kozina ................ G06F 16/254
(Continued)

FOREIGN PATENT DOCUMENTS

JP 2003524812 8/2003
JP 2006172139 6/2006
(Continued)

OTHER PUBLICATIONS

European Patent Office, International Searching Authority, International Search Report and Written Opinion Dated Jun. 4, 2021 For International Application No. PCT/US21/18885, 12 pages.
(Continued)

*Primary Examiner* — Charles D Adams
(74) *Attorney, Agent, or Firm* — TUCKER ELLIS LLP

(57) ABSTRACT

In accordance with an embodiment, described herein are systems and methods for automatic generation of business intelligence (BI) data models using data introspection and curation, as may be used, for example, with enterprise resource planning (ERP) or other enterprise computing or data analytics environments. The described approach uses a combination of manually-curated artifacts, and automatic generation of a model through data introspection, of a source data environment, to derive a target BI data model. For example, a pipeline generator framework can evaluate the dimensionality of a transaction type, degenerate attributes, and application measures; and use the output of this process to create an output target model and pipeline or load plan. The systems and methods described herein provide a technical improvement in the building of new subject areas or a BI data model within much shorter periods of time.

20 Claims, 32 Drawing Sheets

Related U.S. Application Data

(60) Provisional application No. 62/979,269, filed on Feb. 20, 2020, provisional application No. 62/844,004, filed on May 6, 2019.

(51) Int. Cl.
  *G06F 16/28* (2019.01)
  *G06N 5/022* (2023.01)

(56) References Cited

U.S. PATENT DOCUMENTS

| | | | |
|---|---|---|---|
| 9,509,571 | B1 | 11/2016 | Liu |
| 9,529,576 | B2 | 12/2016 | Doughan |
| 10,078,676 | B2 | 9/2018 | Bhagat |
| 10,437,846 | B2 | 10/2019 | Venkatasubramanian |
| 10,620,923 | B2 | 4/2020 | Allan |
| 10,866,938 | B2 | 12/2020 | Gupta |
| 2010/0161648 | A1 | 6/2010 | Eberlein |
| 2011/0295793 | A1 | 12/2011 | Venkatasubramanian |
| 2013/0086134 | A1 | 4/2013 | Doughan |
| 2014/0229511 | A1* | 8/2014 | Tung .................. G06F 16/22 707/803 |
| 2016/0292192 | A1 | 10/2016 | Bhagat |
| 2017/0116295 | A1* | 4/2017 | Wan .................. G06F 16/254 |
| 2018/0032550 | A1 | 2/2018 | Gupta |
| 2018/0052898 | A1 | 2/2018 | Allan |
| 2019/0102526 | A1 | 4/2019 | Koul |
| 2019/0253457 | A1 | 8/2019 | Koul |
| 2020/0356575 | A1 | 11/2020 | Krishnan |

FOREIGN PATENT DOCUMENTS

| | | |
|---|---|---|
| JP | 2019185582 | 10/2019 |
| WO | 2000042532 | 7/2000 |

OTHER PUBLICATIONS

European Patent Office, Communication pursuant to Rules 161(1) and 162 EPC dated Sep. 27, 2022 for European Patent Application No. 21712313.2 , 3 pages.
United States Patent and Trademark Office, Office Communication dated Mar. 3, 2022 for U.S. Appl. No. 16/868,081 , 10 pages.
United States Patent and Trademark Office, Office Communication dated Dec. 8, 2022 for U.S. Appl. No. 16/868,081 , 14 pages.
United States Patent and Trademark Office, Office Communication dated Aug. 3, 2023 for U.S. Appl. No. 16/868,081 , 15 pages.
United States Patent and Trademark Office, Office Communication dated Jan. 5, 2024 for U.S. Appl. No. 16/868,081 , 19 pages.
European Patent Office, Summons to attend oral proceedings pursuant to Rule 115(1) EPC dated Apr. 24, 2024 for European Patent Application No. 21712313.2 , 11 pages.
European Patent Office, Communication pursuant to Article 94(3) EPC dated Oct. 18, 2023 for European Patent Application No. 21712313.2 , 7 pages.
Oracle, "Creating a Repository Using the Oracle BI Administration Tool (12.2.1.0.0)" Copyright © 2015, retrieved on Dec. 1, 2023 from: <https://web.archive.org/web/20151030024408/https://www.oracle.com/webfolder/technetwork/tutorials/obe/fmw/bi/bi1221/rpd/rpd.html>.
Japan Patent Office, Notice of Reasons for Refusal dated Sep. 26, 2024 for Japanese Patent Application No. 2022-549927 , 8 pages.
United States Patent and Trademark Office, Office Communication dated Sep. 30, 2024 for U.S. Appl. No. 16/686,081 , 16 pages.

* cited by examiner

List of Transaction Types (Example) 510

| transactionType | transactionTypeFullName | transactionTypeSpacedName | buildSnapshot | module | securityGroup | txnClass | process |
|---|---|---|---|---|---|---|---|
| BinTrnsf | BINTRANSFER | Bin Transfer | FALSE | Inventory | Inventory | Credit | Y |
| BinWkSht | BINWORKSHEET | Bin Putaway Worksheet | FALSE | Inventory | Inventory | Credit | Y |
| BlankOrd | BLANKETPURCHASEORDER | Blanket Purchase Order | FALSE | Payables | Payables | Debit | Y |
| Build | ASSEMBLYBUILD | Assembly Build | TRUE | Manufacturing | Manufacturing | Credit | Y |
| CardChrg | CREDITCARDCHARGE | Credit Card Charge | FALSE | Customers | Customers | Debit | Y |
| CardRfnd | CREDITCARDREFUND | Credit Card Refund | FALSE | Customers | Customers | Credit | Y |
| CashRfnd | CASHREFUND | Cash Refund | FALSE | Customers | Customers | Debit | Y |
| CashSale | CASHSALE | Cash Sale | FALSE | Sales | Sales | Credit | Y |
| Check | CHECK | Check | FALSE | Bank | Customers | Debit | Y |
| CusChrg | CUSTOMERCHARGE | Customer Charge | FALSE | Customers | Customers | Credit | Y |
| CusCred | CREDITMEMO | Credit Memo | FALSE | Customers | Customers | Debit | Y |
| CustDep | CUSTOMERDEPOSIT | Customer Deposit | FALSE | Customers | Customers | Credit | Y |
| CustInvc | CUSTOMERINVOICE | Customer Invoice | FALSE | Sales | Sales | Credit | Y |
| CusPymt | CUSTOMERPAYMENT | Customer Payment | TRUE | Customers | Customers | Credit | Y |
| CusRfnd | CUSTOMERREFUND | Customer Refund | FALSE | Customers | Customers | Debit | Y |
| DepAppl | DEPOSITAPPLICATION | Deposit Application | FALSE | Customers | Customers | Credit | Y |
| Deposit | DEPOSIT | Deposit | FALSE | Customers | Customers | Credit | Y |
| Estimate | ESTIMATE | Estimate | FALSE | Sales | Sales | Credit | Y |
| ExpRept | EXPENSEREPORT | Expense Report | FALSE | | | | |

FIGURE 19

| Transaction Column List (Example) 520 | | |
|---|---|---|
| actualshipdate | Line | Degenerate | NAN |
| amortizationenddate | Line | Degenerate | NAN |
| amortizationresidual | Line | Degenerate | NAN |
| amortizstartdate | Line | Degenerate | NAN |
| assemblycomponent | Line | Degenerate | NAN |
| billeddate | Line | Degenerate | NAN |
| billvariancestatus | Line | Degenerate | NAN |
| category | Line | Degenerate | NAN |
| cleared | Line | Degenerate | NAN |
| cleareddate | Line | Degenerate | NAN |
| createdfrom | Line | Degenerate | NAN |
| documentnumber | Line | Degenerate | NAN |
| donotdisplayline | Line | Degenerate | NAN |
| eliminate | Line | Degenerate | NAN |
| expectedreceiptdate | Line | Degenerate | NAN |
| expensedate | Line | Degenerate | NAN |
| hasfulfillableitems | Line | Degenerate | NAN |
| isbillable | Line | Degenerate | NAN |
| isclosed | Line | Degenerate | NAN |
| iscogs | Line | Degenerate | NAN |

SYSTEM AND METHOD FOR AUTOMATIC GENERATION OF BI MODELS USING DATA INTROSPECTION AND CURATION

CLAIM OF PRIORITY

This application claims the benefit of priority to U.S. Provisional patent application titled "SYSTEM AND METHOD FOR AUTOMATIC GENERATION OF BI MODELS USING DATA INTROSPECTION AND CURATION", Application No. 62/979,269, filed Feb. 20, 2020; and is a continuation-in-part of U.S. patent application titled "SYSTEM AND METHOD FOR CUSTOMIZATION IN AN ANALYTIC APPLICATIONS ENVIRONMENT", application Ser. No. 16/868,081, filed May 6, 2020, which claims the benefit of priority to U.S. Provisional Patent Application titled "SYSTEM AND METHOD FOR CUSTOMIZATION IN AN APPLICATION ANALYTICS ENVIRONMENT", Application No. 62/844,004, filed May 6, 2019; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer data analytics, business intelligence (BI), and enterprise resource planning (ERP) or other enterprise computing environments, and are particularly related to systems and methods for automatic generation of BI data models for use in such environments, using data introspection and curation.

BACKGROUND

Data analytics enables the examination of large amounts of data, in order to derive conclusions or other information from the data; while business intelligence (BI) tools provide business users with information describing the data in a format that enables those business users to make strategic business decisions.

Increasingly, there is an interest in developing software applications that leverage the use of data analytics within the context of an organization's enterprise resource planning (ERP) or other enterprise computing environments; or within the context of a software-as-a-service (SaaS) or cloud environment. However, the traditional approaches to preparing BI data models are less successful when addressing the complex schemas used in modern enterprise computing environments.

SUMMARY

In accordance with an embodiment, described herein are systems and methods for automatic generation of business intelligence (BI) data models using data introspection and curation, as may be used, for example, with enterprise resource planning (ERP) or other enterprise computing or data analytics environments. The described approach uses a combination of manually-curated artifacts, and automatic generation of a model through data introspection, of a source data environment, to derive a target BI data model. For example, a pipeline generator framework can evaluate the dimensionality of a transaction type, degenerate attributes, and application measures; and use the output of this process to create an output target model and pipeline or load plan. The systems and methods described herein provide a technical improvement in the building of new subject areas or a BI data model within much shorter periods of time.

BRIEF DESCRIPTION OF THE DRAWINGS

FIG. 19 illustrates an example list of transaction types, in accordance with an embodiment.

FIG. 20 illustrates an example transaction column list, in accordance with an embodiment.

FIG. 24 illustrates an example user interface for use with a system for automatic generation of BI data models, in accordance with an embodiment.

FIG. 27 illustrates an example user interface for use with a system for automatic generation of BI data models, in accordance with an embodiment.

FIG. 31 illustrates an example user interface for use with a system for automatic generation of BI data models, in accordance with an embodiment.

DETAILED DESCRIPTION

Figure 1:
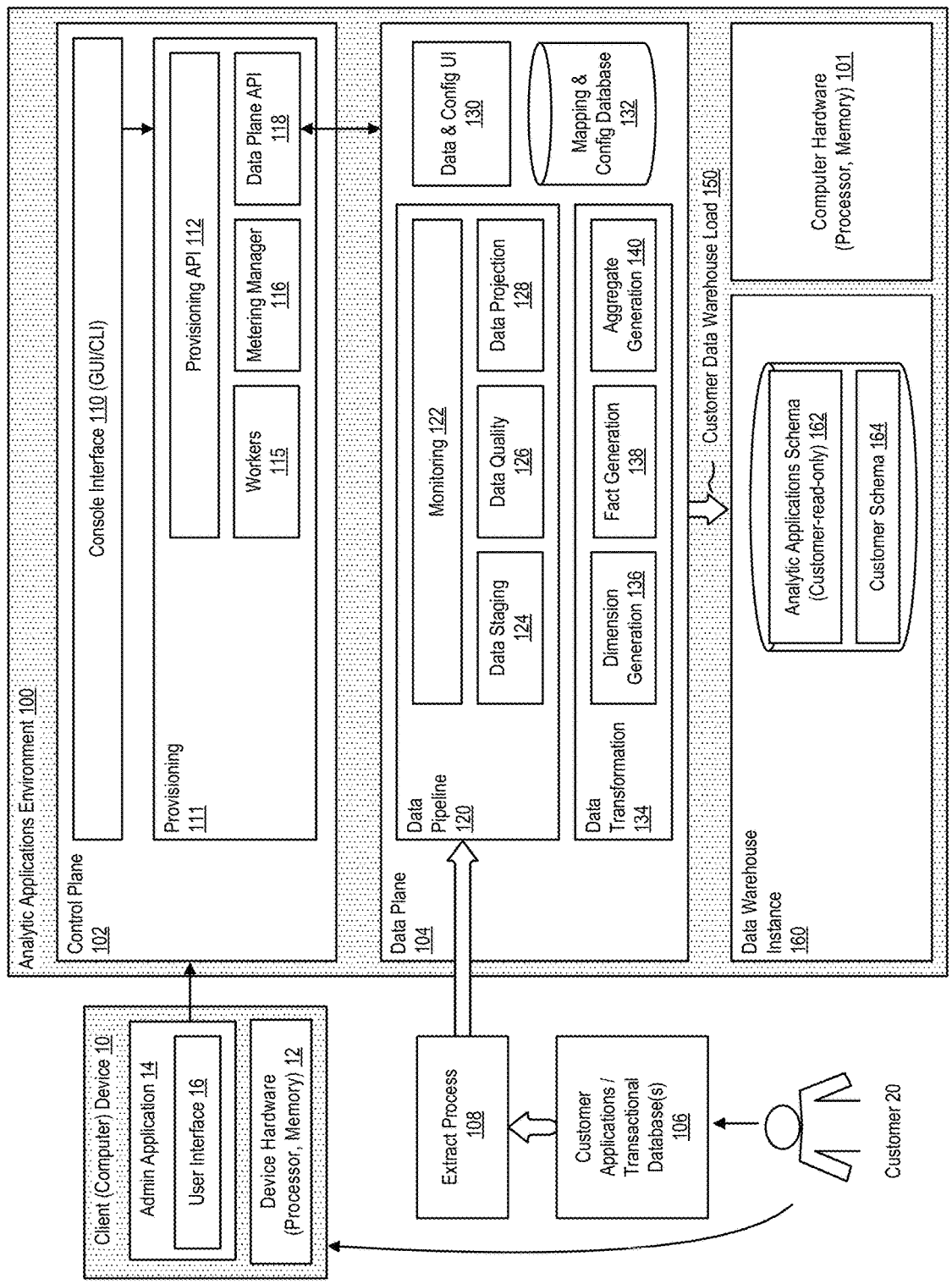
FIG. 1 illustrates a system for providing an analytic applications environment, in accordance with an embodiment.

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

In accordance with an embodiment, an analytic applications environment enables data analytics within the context of an organization's enterprise software application or data environment, or a software-as-a-service or other type of cloud environment; and supports the development of computer-executable software analytic applications.

In accordance with an embodiment, a data pipeline or process, such as, for example, an extract, transform, load process, can operate in accordance with an analytic applications schema adapted to address particular analytics use cases or best practices, to receive data from a customer's (tenant's) enterprise software application or data environment, for loading into a data warehouse instance.

In accordance with an embodiment, each customer (tenant) can additionally be associated with a customer tenancy and a customer schema. The data pipeline or process populates their data warehouse instance and database tables with data as received from their enterprise software application or data environment, as defined by a combination of the analytic applications schema, and their customer schema.

In accordance with an embodiment, a technical advantage of the described systems and methods includes that the use of a system-wide or shared analytic applications schema or data model, maintained within an analytic applications environment (cloud) tenancy; together with tenant-specific customer schemas, maintained within customer tenancies; enables each customer's (tenant's) data warehouse instance, or database tables, to be populated or otherwise associated with live data (live tables), as received from their enterprise software application or data environment, on an automated or a periodic, e.g., hourly/daily/weekly, or other basis, and reflecting best practices for particular analytics use cases. Examples of such analytics use cases can include Enterprise Resource Planning (ERP), Human Capital Management (HCM), Customer Experience (CX), Supply Chain Management (SCM), Enterprise Performance Management (EPM), or other types of analytics use cases. The populated data warehouse instance or database tables can then be used to create computer-executable software analytic applications, or to determine data analytics or other information associated with the data.

In accordance with an embodiment, a computer-executable software analytic application can be associated with a data pipeline or process, such as, for example, an extract, transform, load (ETL) process, or an extract, load, transform (ELT) process, maintained by a data integration component, such as, for example, an Oracle Data Integrator (ODI) environment, or other type of data integration component.

In accordance with an embodiment, the analytic applications environment can operate with a data warehouse environment or component, such as, for example, an Oracle Autonomous Data Warehouse (ADW), Oracle Autonomous Data Warehouse Cloud (ADWC), or other type of data warehouse environment or component adapted to store large amounts of data; which can be populated via a star schema sourced from an enterprise software application or data environment, such as, for example, an Oracle Fusion Applications, or other type of enterprise software application or data environment. The data made available to each customer (tenant) of the analytic applications environment can be provisioned in an, e.g., ADWC, tenancy that is associated with, and accessible only to, that customer (tenant); while providing access to other features of a shared infrastructure.

For example, in accordance with an embodiment, the analytic applications environment can include a data pipeline or process layer that enables a customer (tenant) to ingest data extracted from their Oracle Fusion Applications environment, to be loaded into a data warehouse instance within their ADWC tenancy, including support for features such as multiple data warehouse schemas, data extract and target schemas, and monitoring of data pipeline or process stages; coupled with a shared data pipeline or process infrastructure that provides common transformation maps or repositories.

INTRODUCTION

In accordance with an embodiment, a data warehouse environment or component, such as, for example, an Oracle Autonomous Data Warehouse (ADW), Oracle Autonomous Data Warehouse Cloud (ADWC), or other type of data warehouse environment or component adapted to store large amounts of data, can provide a central repository for storage of data collected by one or more business applications.

For example, in accordance with an embodiment, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions; enterprise users of conventional business intelligence (BI) applications and processes generally face the task of extracting data from their horizontal and vertical business applications, and introducing the extracted data into a data warehouse—a process which can be both time and resource intensive.

In accordance with an embodiment, the analytic applications environment allows customers (tenants) to develop computer-executable software analytic applications for use with a BI component, such as, for example, an Oracle Business Intelligence Applications (OBIA) environment, or other type of BI component adapted to examine large amounts of data sourced either by the customer (tenant) itself, or from multiple third-party entities.

For example, in accordance with an embodiment, when used with a SaaS business productivity software product suite that includes a data warehouse component, the analytic applications environment can be used to populate the data warehouse component with data from the business productivity software applications of the suite. Predefined data integration flows can automate the ETL processing of data between the business productivity software applications and the data warehouse, which processing might have been conventionally or manually performed by the users of those services.

As another example, in accordance with an embodiment, the analytic applications environment can be pre-configured with database schemas for storing consolidated data sourced across various business productivity software applications of a SaaS product suite. Such pre-configured database schemas can be used to provide uniformity across the productivity software applications and corresponding transactional databases offered in the SaaS product suite; while allowing the user to forgo the process of manually designing, tuning, and modeling the provided data warehouse.

As another example, in accordance with an embodiment, the analytic applications environment can be used to pre-populate a reporting interface of a data warehouse instance with relevant metadata describing business-related data objects in the context of various business productivity software applications, for example, to include predefined dashboards, key performance indicators (KPIs), or other types of reports.

Analytic Applications Environment

FIG. 1 illustrates a system for providing an analytic applications environment, in accordance with an embodiment.

As illustrated in FIG. 1, in accordance with an embodiment, an analytic applications environment 100 can be provided by, or otherwise operate at, a computer system having a computer hardware (e.g., processor, memory) 101, and including one or more software components operating as a control plane 102, and a data plane 104, and providing access to a data warehouse, or data warehouse instance 160.

In accordance with an embodiment, the components and processes illustrated in FIG. 1, and as further described herein with regard to various other embodiments, can be provided as software or program code executable by a computer system or other type of processing device.

For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example, an Oracle Analytics Cloud or Oracle Cloud Infrastructure environment, or other type of cloud environment.

For example, in accordance with an embodiment, the control plane can include a console interface 110 that enables access by a client computer device 10 having a device hardware 12, administrative application 14, and user interface 16, under control of a customer (tenant) 20 and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants).

For example, in accordance with an embodiment, the console interface can provide interfaces that allow customers to provision services for use within their SaaS environment, and to configure those services that have been provisioned.

In accordance with an embodiment, the provisioning component can include various functionality to provision services that are specified by provisioning commands.

For example, in accordance with an embodiment, the provisioning component can be accessed and utilized, via the console interface, by a customer (tenant) to purchase one or more of a suite of business productivity software applications, together with a data warehouse instance for use with those software applications.

In accordance with an embodiment, a customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane.

For example, in accordance with an embodiment, provisioning and configuration changes directed to services provided by the data plane can be communicated to the data plane via the data plane API.

In accordance with an embodiment, the metering manager can include various functionality that meters services and usage of services provisioned through control plane.

For example, in accordance with an embodiment, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the analytic applications environment. The model format can be provided in any data format suited for storage in a data warehouse.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic or other basis.

In accordance with an embodiment, to support multiple tenants, the system can enable the use of multiple data warehouses or data warehouse instances.

For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data.

For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset incudes no dependencies on any other model data set; and a second model data set includes dependencies to the first model data set; then the monitoring component can determine to transform the first data set before the second data set, to accommodate the second data set's dependencies on the first data set.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

For example, in accordance with an embodiment, dimensions can include categories of data such as, for example, "name," "address," or "age". Fact generation includes the generation of values that data can take, or "measures." Facts are associated with appropriate dimensions in the data warehouse instance. Aggregate generation includes creation of data mappings which compute aggregations of the transformed data to existing data in the customer schema 164 of data warehouse instance.

In accordance with an embodiment, once any transformations are in place (as defined by the data model), the data pipeline or process can read the source data, apply the transformation, and then push the data to the data warehouse instance.

In accordance with an embodiment, data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Horizontally and vertically integrated business software applications are generally directed to capturing of data in real time. This is a result of horizontally and vertically integrated business software applications being generally used for daily workflow, and storing data in a transactional database, which means that only the most current data is generally stored in such databases.

For example, while a HCM application might update a record associated with an employee when the employee transfers offices, such HCM application would generally not maintain a record of each office that the employee had worked in during their tenure with a company. As such, a BI-related query seeking to determine employee mobility within a company would not have adequate records within the transaction database to complete such a query.

In accordance with an embodiment, by storing historical, in addition to current data, generated by the horizontally and vertically integrated business software applications, in a context that is readily understandable by BI applications, the data warehouse instance as populated using the above technique provides a resource for BI applications to process such queries, using an interface provided, for example, by a business productivity and analytics product suite, or by a SQL tool of the customer's choice.

Data Pipeline Process

Figure 2:
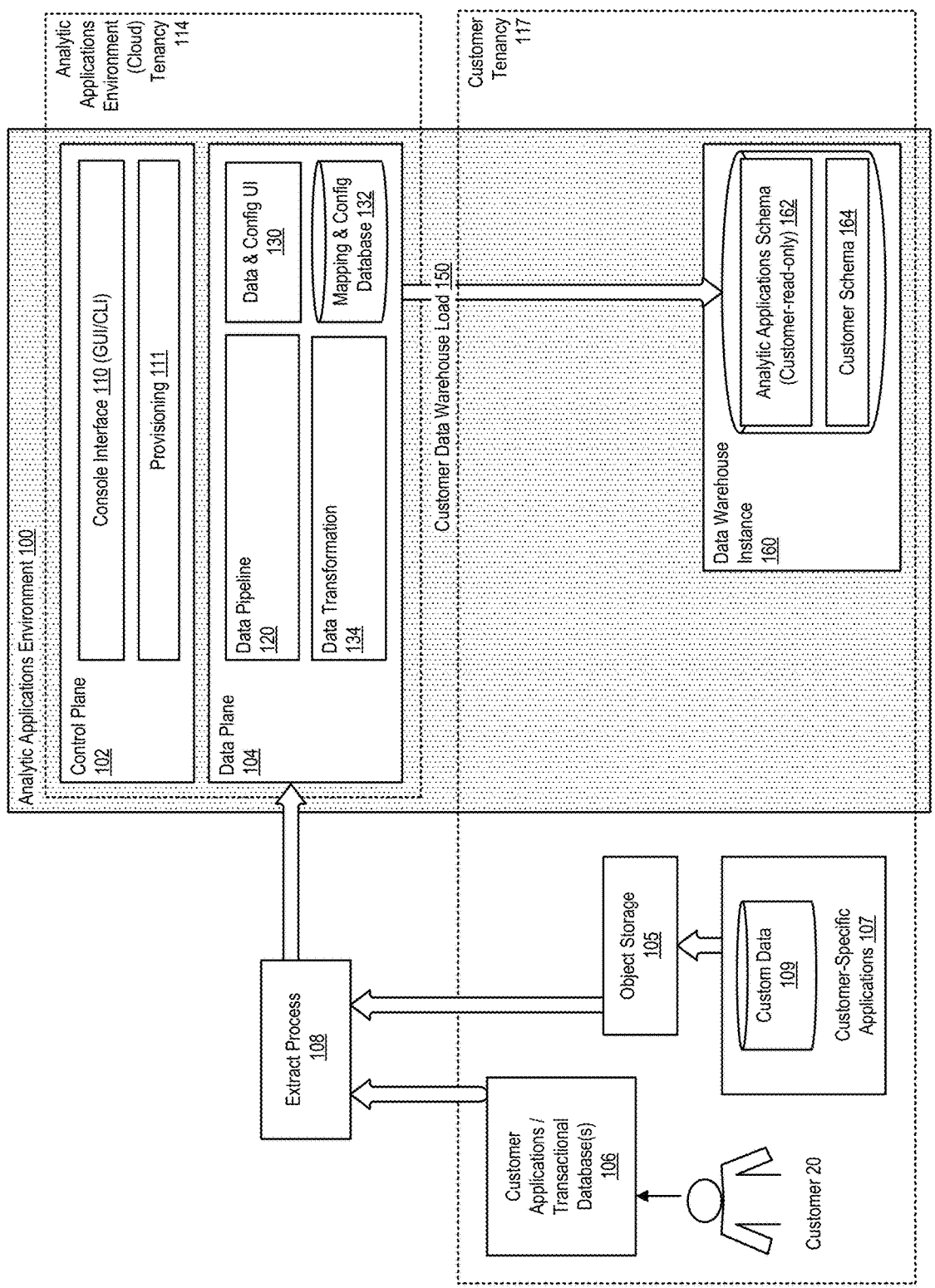
FIG. 2 further illustrates a system for providing an analytic applications environment, in accordance with an embodiment.

FIG. 2 further illustrates a system for providing an analytic applications environment, in accordance with an embodiment.

As illustrated in FIG. 2, in accordance with an embodiment, data can be sourced, e.g., from a customer's (tenant's) enterprise software application or data environment (106), using the data pipeline process as described above; or as custom data 109 sourced from one or more customer-specific applications 107; and loaded to a data warehouse instance, including in some examples the use of an object storage 105 for storage of the data.

In accordance with an embodiment, the data pipeline or process maintains, for each customer (tenant), an analytic applications schema, e.g., as a star schema, that is updated on a periodic or other basis, by the system in accordance with best practices for a particular analytics use case, e.g., human capital management (HCM) analytics, or enterprise resource planning (ERP) analytics.

In accordance with an embodiment, for each customer (tenant), the system uses the analytic applications schema that is maintained and updated by the system, within an analytic applications environment (cloud) tenancy 114, to pre-populate a data warehouse instance for the customer, based on an analysis of the data within that customer's enterprise applications environment, and within a customer tenancy 117. As such, the analytic applications schema maintained by the system enables data to be retrieved, by the data pipeline or process, from the customer's environment, and loaded to the customer's data warehouse instance in a "live" manner.

In accordance with an embodiment, the analytic applications environment also provides, for each customer of the environment, a customer schema that is readily modifiable by the customer, and which allows the customer to supplement and utilize the data within their own data warehouse instance. For each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics For example, in accordance with an embodiment, a data warehouse (e.g., an Oracle Autonomous Data Warehouse, ADWC) can include an analytic applications schema and, for each customer/tenant, a customer schema sourced from their enterprise software application or data environment. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Extraction, Transformation, Load/Publish

Figure 3:
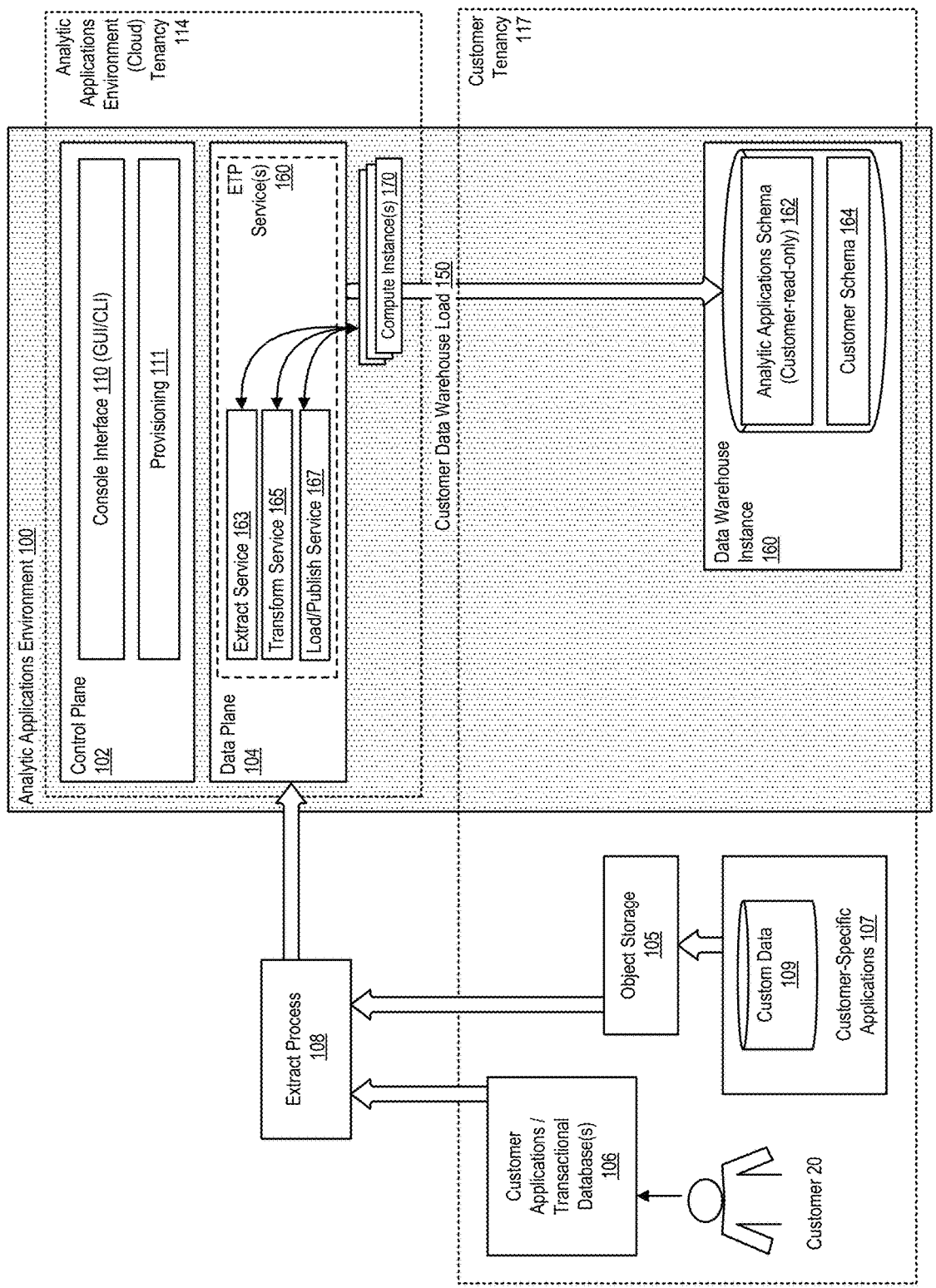
FIG. 3 further illustrates a system for providing an analytic applications environment, in accordance with an embodiment.

FIG. 3 further illustrates a system for providing an analytic applications environment, in accordance with an embodiment.

As illustrated in FIG. 3, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

Extraction: in accordance with an embodiment, a list of view objects for extractions can be submitted, for example, to an Oracle BI cloud connector (BICC) component via a ReST call. The extracted files can be uploaded to an object storage component, such as, for example, an Oracle Storage Service (OSS) component, for storage of the data.

Transformation: In accordance with an embodiment, the transformation process takes the data files from object storage component (e.g., OSS), and applies a business logic while loading them to a target data warehouse, e.g., an ADWC database, which is internal to the data pipeline or process, and is not exposed to the customer (tenant).

Load/Publish: In accordance with an embodiment, a load/publish service or process takes the data from the, e.g., ADWC database or warehouse, and publishes it to a data warehouse instance that is accessible to the customer (tenant).

Multiple Customers (Tenants)

Figure 4:
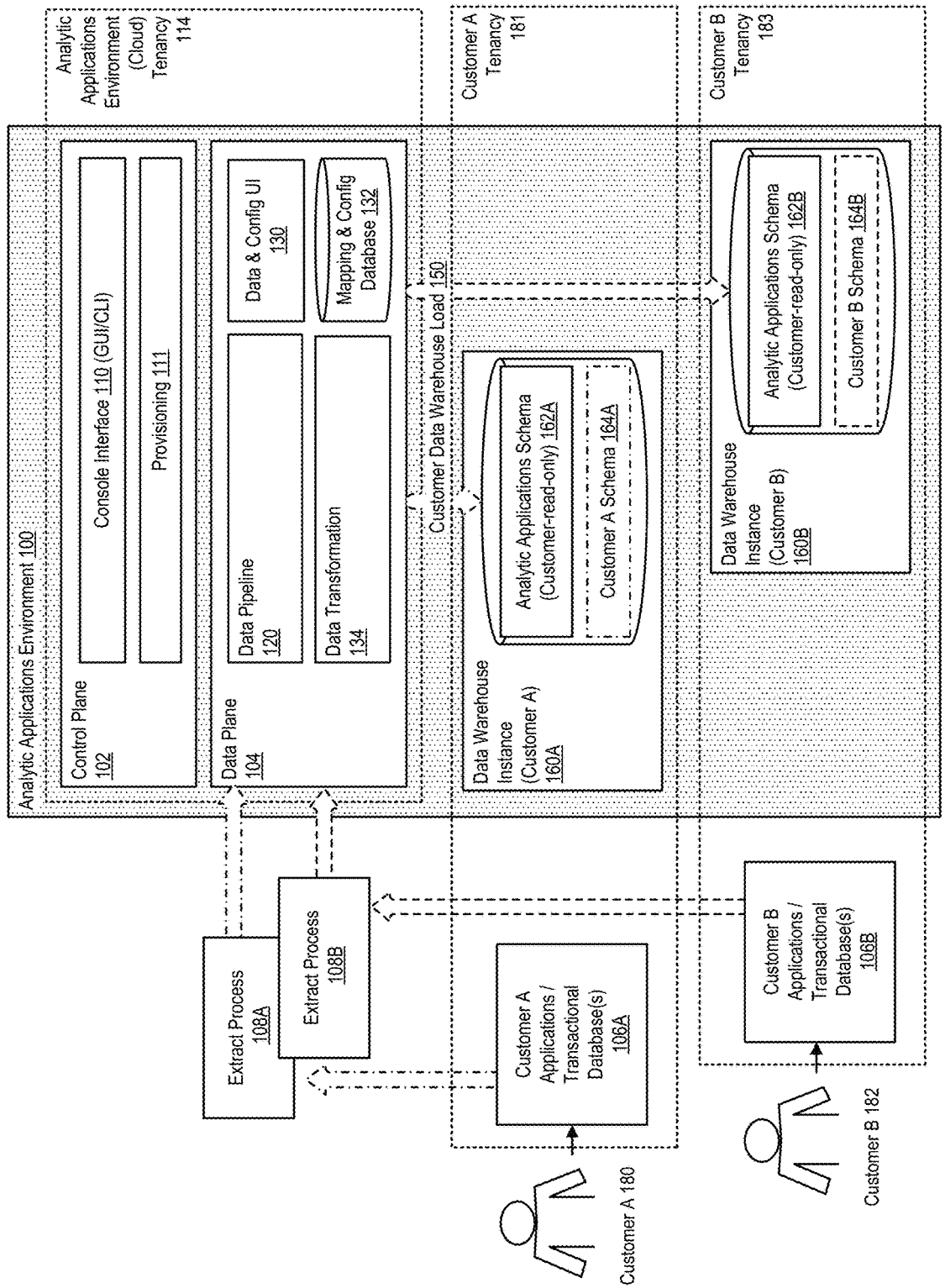
FIG. 4 further illustrates a system for providing an analytic applications environment, in accordance with an embodiment.

FIG. 4 further illustrates a system for providing an analytic applications environment, in accordance with an embodiment.

As illustrated in FIG. 4, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, an analytic applications schema that is updated on a periodic or other basis, by the system in accordance with best practices for a particular analytics use case.

In accordance with an embodiment, for each of a plurality of customers (e.g., customers A, B), the system uses the analytic applications schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the analytic applications environment also provides, for each of a plurality of customers of the environment, a customer schema (e.g., customer A schema 164A, customer B schema 164B) that is readily modifiable by the customer, and which allows the customer to supplement and utilize the data within their own data warehouse instance.

As described above, in accordance with an embodiment, for each of a plurality of customers of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

Activation Plans

Figure 5:
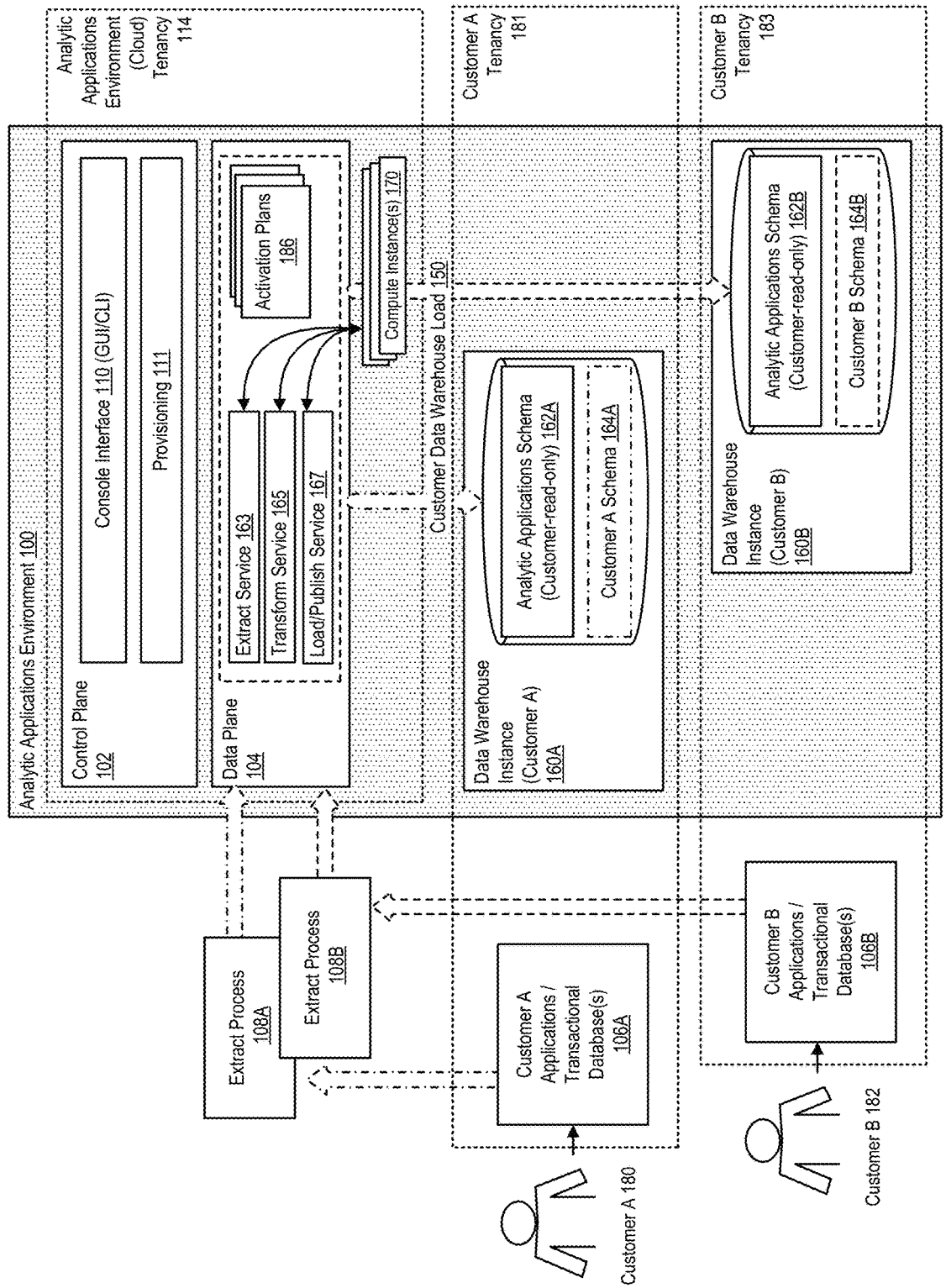
FIG. 5 further illustrates a system for providing an analytic applications environment, in accordance with an embodiment.

FIG. 5 further illustrates a system for providing an analytic applications environment, in accordance with an embodiment.

In accordance with an embodiment, activation plans 186 can be used to control the operation of the data pipeline or process services for a customer, for a particular functional area, to address that customer's (tenant's) particular needs.

For example, in accordance with an embodiment, an activation plan can define a number of extract, transform, and load (publish) services or steps to be run in a certain order, at a certain time of day, and within a certain window of time.

In accordance with an embodiment, each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

In accordance with an embodiment, activation plans can be stored in the mapping and configuration database and are customizable by the customer via the data and configuration UI. Each customer can have a number of activation plans. Compute instances/services (virtual machines) which execute the ETL process for various customers, according to their activation plans, can be dedicated to a particular service for the use of an activation plan, and then released for use by other services and activation plans.

In accordance with an embodiment, based on a determination of historical performance data recorded over a period of time, the system can optimize the execution of activation plans, e.g., for one or more functional areas associated with a particular tenant, or across a sequence of activation plans associated with multiple tenants, to address utilization of the VMs and service level agreements (SLAs) for those tenants. Such historical data can include statistics of load volumes and load times.

For example, in accordance with an embodiment, the historical data can include size of extraction, count of extraction, extraction time, size of warehouse, transform time, publish (load) time, view object extract size, view object extract record count, view object extract time, warehouse table count, count of records processed for a table, warehouse table transform time, publish table count, and publish time. Such historical data can be used to estimate and plan current and future activation plans in order to organize various tasks to, such as, for example, run in sequence or in parallel to arrive at a minimum time to run an activation plan. In addition, the gathered historical data can be used to optimize across multiple activation plans for a tenant. In some embodiments, the optimization of activation plans (i.e., a particular sequence of jobs, such as ETLs) based upon historical data can be automatic.

ETL Process Flow

Figure 6:
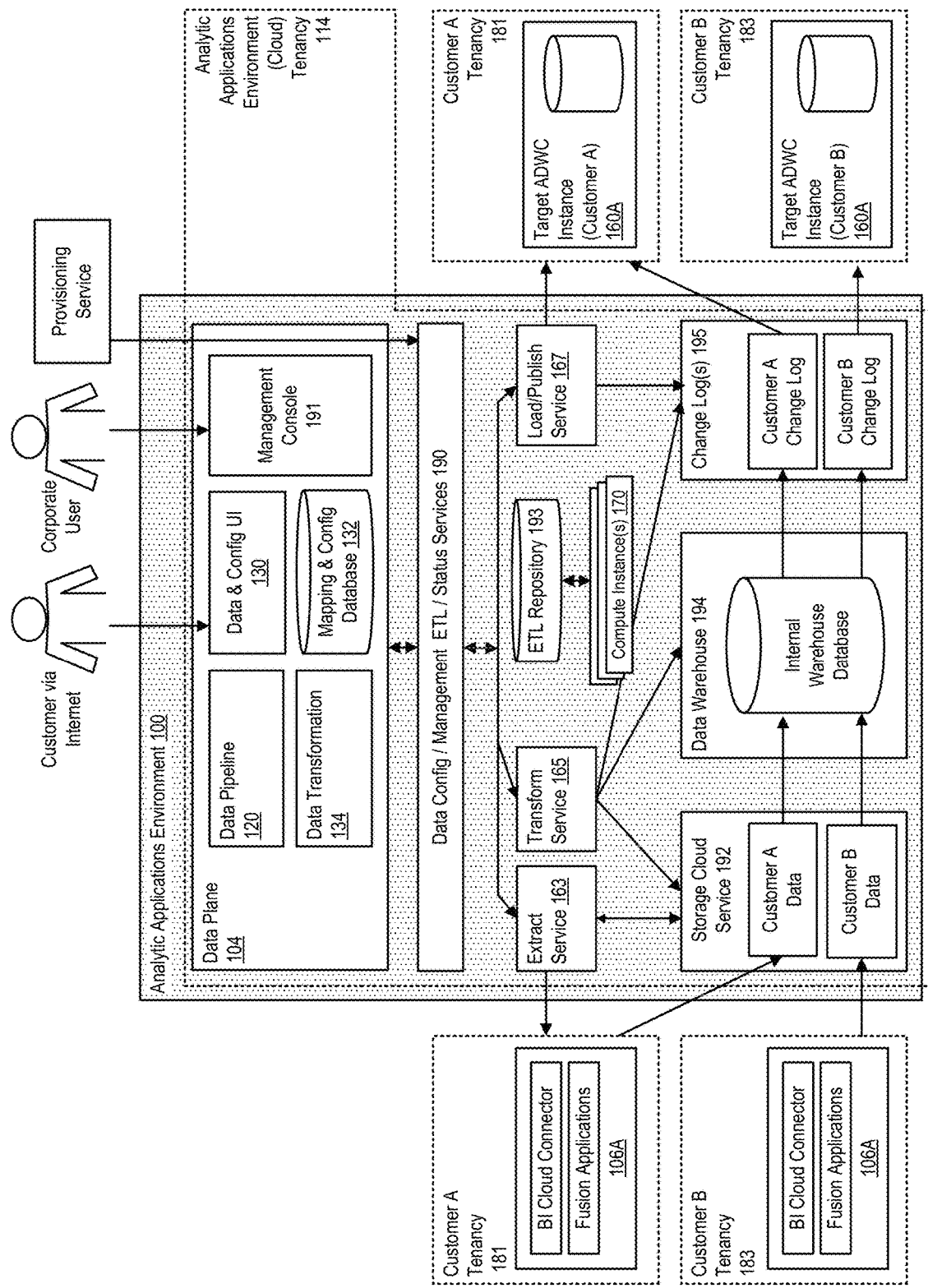
FIG. 6 further illustrates a system for providing an analytic applications environment, in accordance with an embodiment.

FIG. 6 further illustrates a system for providing an analytic applications environment, in accordance with an embodiment.

As illustrated in FIG. 6, in accordance with an embodiment, the system enables a flow of data, controlled by a data config/management/ETL/status services 190 within an (e.g., Oracle) managed tenancy, from each customer's enterprise software application environment (e.g., their Fusion Applications environment), including in this example, a BICC component, via a storage cloud service 192, e.g., OSS, and from there to a data warehouse instance.

As described above, in accordance with an embodiment, the flow of data can be managed by one or more services, including for example, an extract service, and a transform service as described above, and with reference to an ETL repository 193, that takes the data from the storage cloud service, and loads the data into an internal target data warehouse (e.g., an ADWC database) 194, which is internal to the data pipeline or process and is not exposed to the customer.

In accordance with an embodiment, data is moved in stages into the data warehouse, and thereafter into database table change logs 195, from where the load/publish service can load the customer data into a target data warehouse instance associated with and accessible by the customer, within its customer tenancy.

ETL Stages

Figure 7:
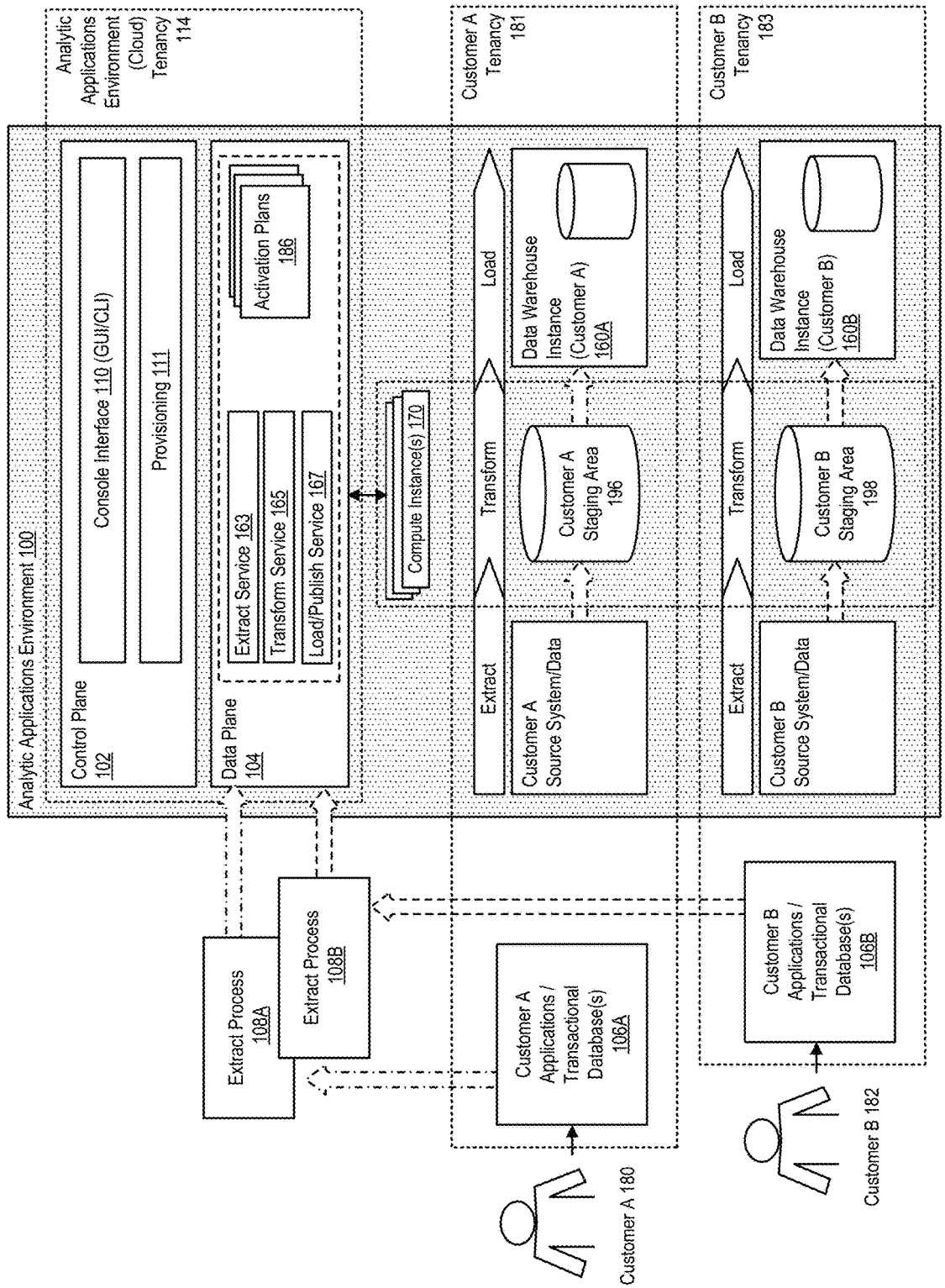
FIG. 7 further illustrates a system for providing an analytic applications environment, in accordance with an embodiment.

FIG. 7 further illustrates a system for providing an analytic applications environment, in accordance with an embodiment.

In accordance with an embodiment, the extracting, transforming and loading data from enterprise applications to a data warehouse instance involves multiple stages, and each stage can have several sequential or parallel jobs; and run on different spaces/hardware, including different staging areas 196, 198 for each customer.

Analytic Applications Environment Metrics

Figure 8:
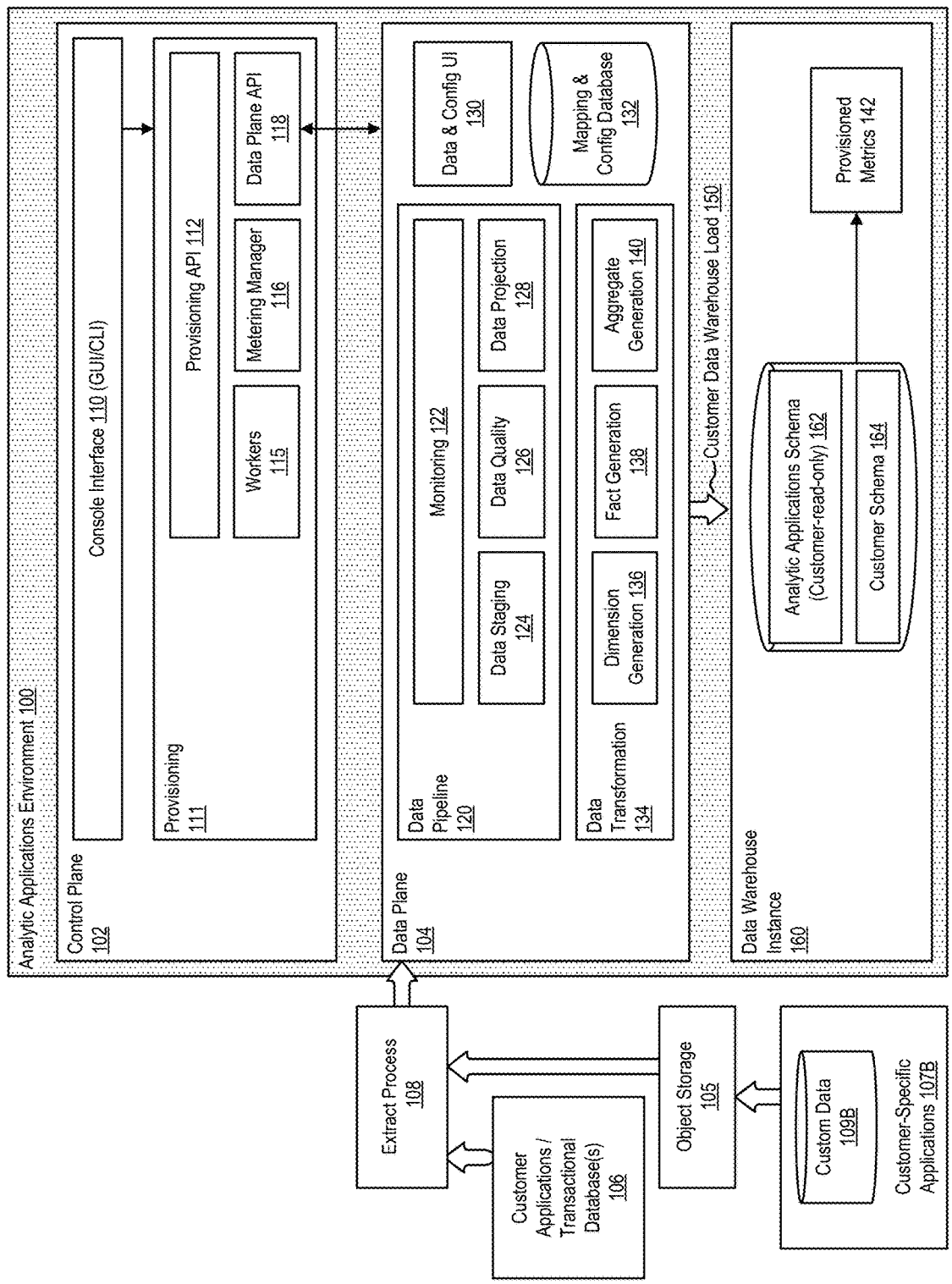
FIG. 8 further illustrates a system for providing an analytic applications environment, in accordance with an embodiment.

FIG. 8 further illustrates a system for providing an analytic applications environment, in accordance with an embodiment.

As illustrated in FIG. 8, in accordance with an embodiment, the metering manager can include functionality that meters services and usage of services provisioned through the control plane, and provide provisioned metrics 142.

For example, the metering manager can record a usage over time of processors provisioned via the control plane, for particular customers, for billing purposes. Likewise, the metering manager can record an amount of storage space of data warehouse partitioned for use by a customer of the SaaS environment, for billing purposes.

Analytic Applications Environment Customization

Figure 9:
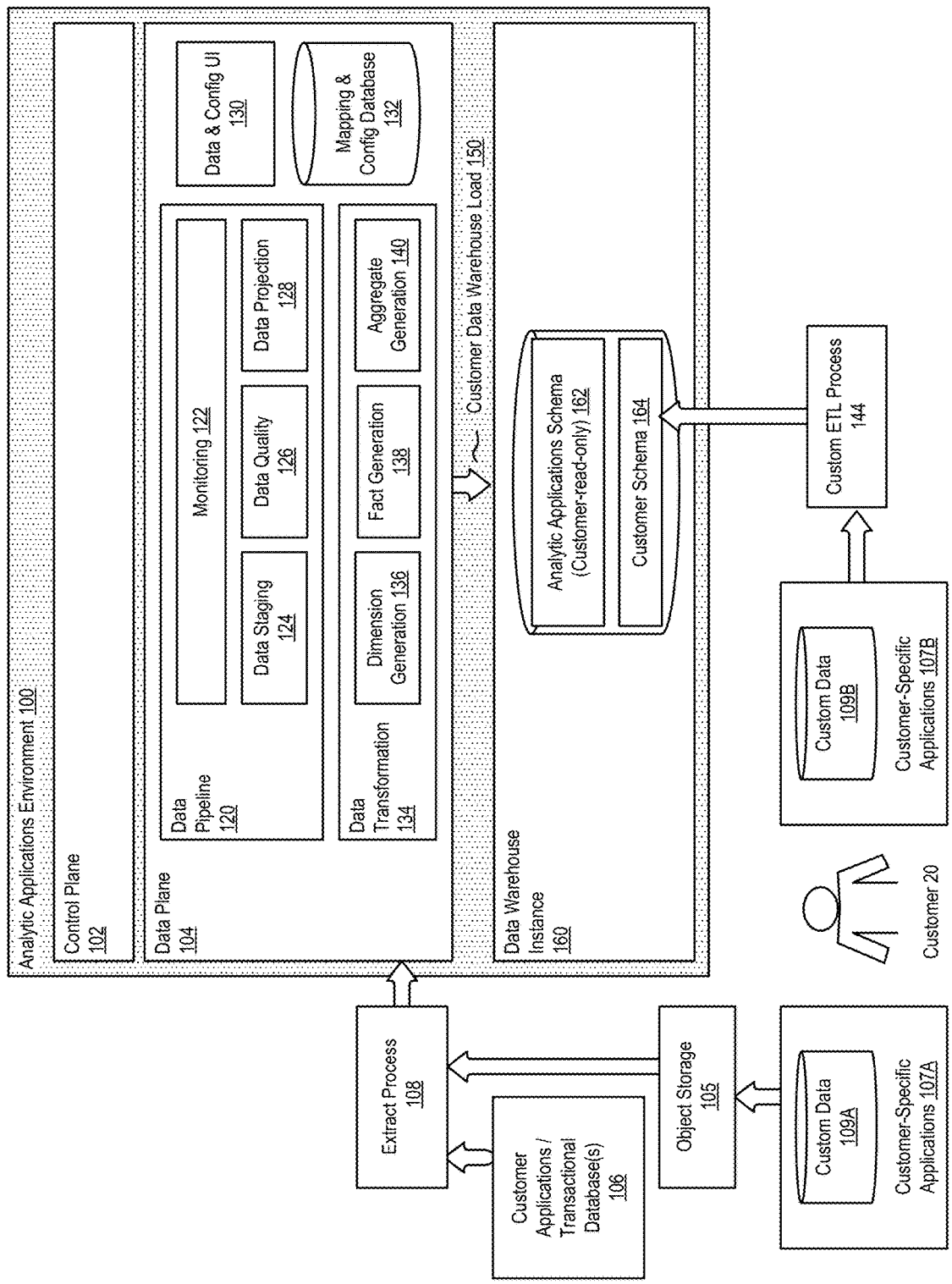
FIG. 9 further illustrates a system for providing an analytic applications environment, in accordance with an embodiment.

FIG. 9 further illustrates a system for providing an analytic applications environment, in accordance with an embodiment.

As illustrated in FIG. 9, in accordance with an embodiment, in addition to data that can be sourced, e.g., from a customer's enterprise software application or data environment, using the data pipeline process as described above; one or more additional custom data 109A, 109B, that is sourced from one or more customer-specific applications 107A, 107B, can also be extracted, transformed, and loaded to a data warehouse instance, using either: the data pipeline process as described above, including in some examples the use of an object storage for storage of the data; and/or a custom ETL or other process 144 that is mutable from the customer's perspective. Once data has been loaded into their data warehouse instance, customers can create business database views that combine tables from both their customer schema and the software analytic application schema; and can query their data warehouse instance using an interface provided, for example, by a business productivity and analytics product suite, or by a SQL tool of the customer's choice.

Analytic Applications Environment Method

Figure 10:
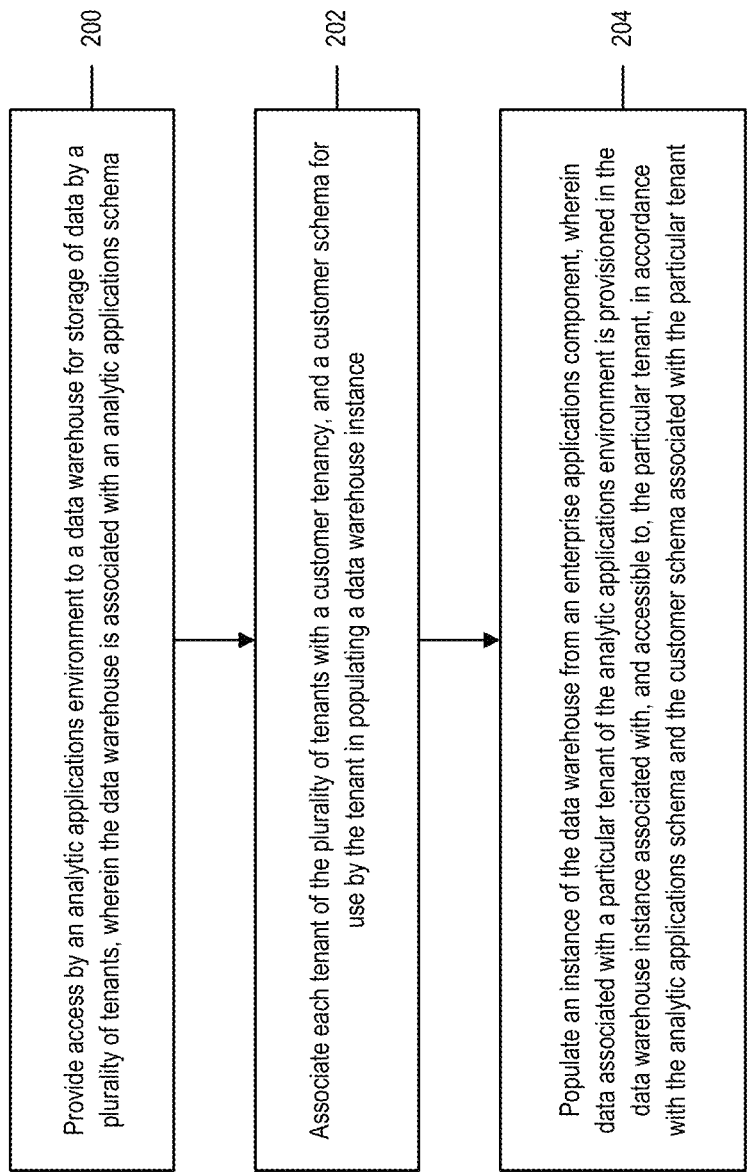
FIG. 10 illustrates a flowchart of a method for providing an analytic applications environment, in accordance with an embodiment.

FIG. 10 illustrates a flowchart of a method for providing an analytic applications environment, in accordance with an embodiment.

As illustrated in FIG. 10, in accordance with an embodiment, at step 200, an analytic applications environment provides access to a data warehouse for storage of data by a plurality of tenants, wherein the data warehouse is associated with an analytic applications schema.

At step 202, each tenant of the plurality of tenants is associated with a customer tenancy, and a customer schema for use by the tenant in populating a data warehouse instance.

At step 204, an instance of the data warehouse is populated with data received from an enterprise software application or data environment, wherein data associated with a particular tenant of the analytic applications environment is provisioned in the data warehouse instance associated with, and accessible to, the particular tenant, in accordance with the analytic applications schema and the customer schema associated with the particular tenant.

Extensibility and Customization

Different customers of a data analytics environment may have different requirements with regard to how their data is classified, aggregated, or transformed, for purposes of providing data analytics or business intelligence data, or developing software analytic applications.

in accordance with an embodiment, to support such different requirements, the system can include a semantic layer that enables the use of custom semantic extensions to extend a semantic data model (semantic model), and provide custom content at a presentation layer. Extension wizards or development environments can guide users in using the custom semantic extensions to extend or customize the semantic model, through a definition of branches and steps, followed by promotion of the extended or customized semantic model to a production environment.

In accordance with various embodiments, technical advantages of the described approach include support for additional types of data sources. For example, a user can perform data analytics based on a combination of ERP data sourced from a first vendor's product and HCM data sourced from a second, different vendor's product; or based on a combination of data received from multiple data sources having different regulatory requirements. A user's defined extensions or customizations can endure patches, updates, or other changes to the underlying system.

Figure 11:
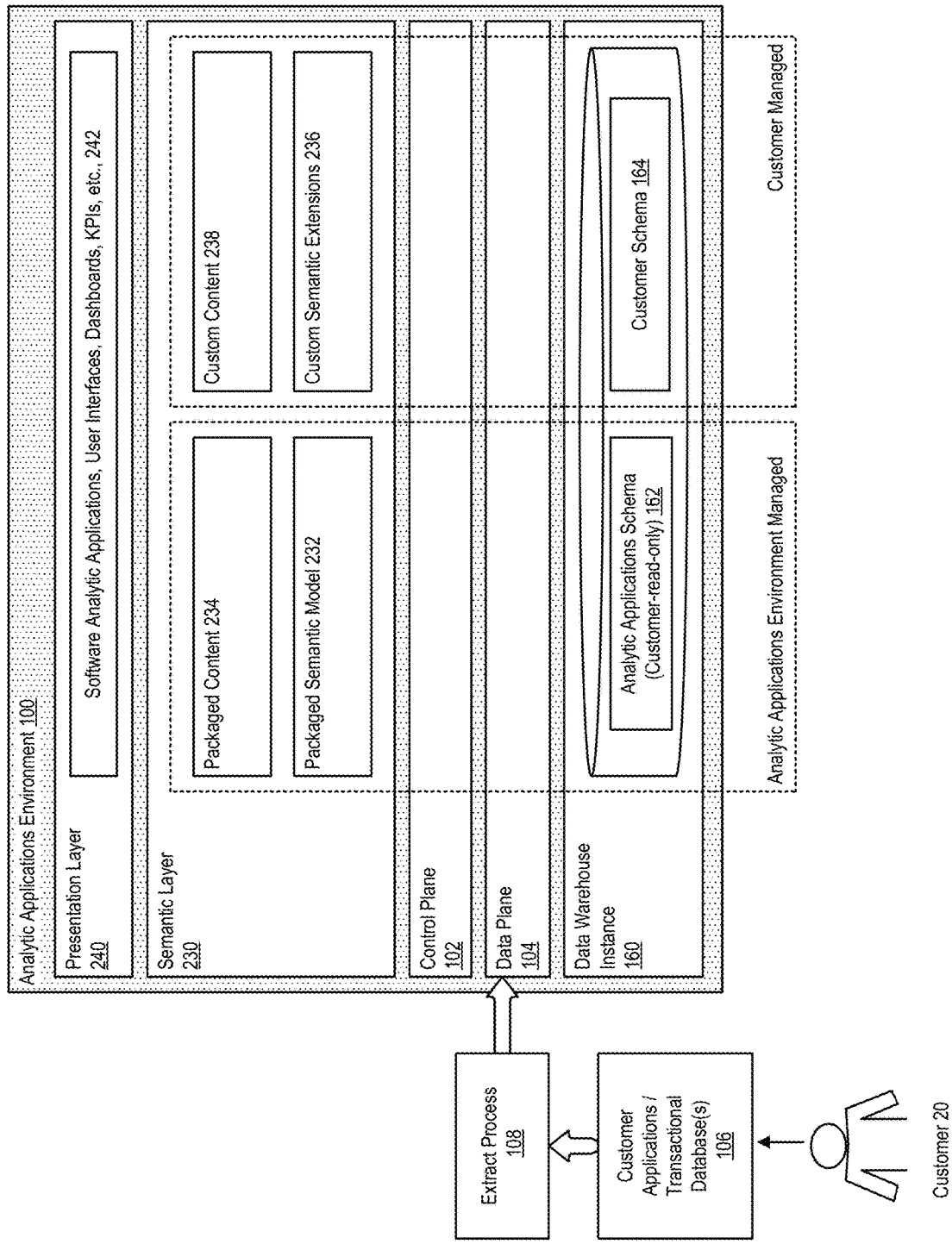
FIG. 11 illustrates an analytic applications environment that enables extensibility and customization, in accordance with an embodiment.

FIG. 11 illustrates a system for supporting extensibility and customization in an analytic applications environment, in accordance with an embodiment.

In accordance with an embodiment, a semantic layer can include data defining a semantic model of a customer's data; which is useful in assisting users in understanding and accessing that data using commonly-understood business terms. A semantic layer can include a physical layer that maps to a physical data model or data plane; a logical layer that operates as a mapping or transformation layer where calculations can be defined; and a presentation layer that enables a user to access the data as content.

As illustrated in FIG. 11, in accordance with an embodiment, the semantic layer 230 can include a packaged (out-of-the-box, initial) semantic model 232 that can be used to provide a packaged content 234. For example, the system can use an ETL or other data pipeline or process as described above, to load data from a customer's enterprise software application or data environment into a data warehouse instance, wherein the packaged semantic model can then be used to provide packaged content to the presentation layer.

In accordance with an embodiment, the semantic layer can also be associated with one or more semantic extensions 236 that can be used to extend the packaged semantic model, and provide custom content 238 to the presentation layer 240.

In accordance with an embodiment, the presentation layer can enable access to the data content using, for example, a software analytic application, user interface, dashboard, key performance indicators (KPI's) 242; or other type of report or interface as may be provided by products such as, for example, Oracle Analytics Cloud, or Oracle Analytics for Applications.

In accordance with an embodiment, in addition to data sourced from a customer's environment using the ETL or other data pipelines or processes described above; customer data can be loaded to a data warehouse instance using a variety of data models or scenarios that provide opportunities for further extensibility and customization.

Figure 12:
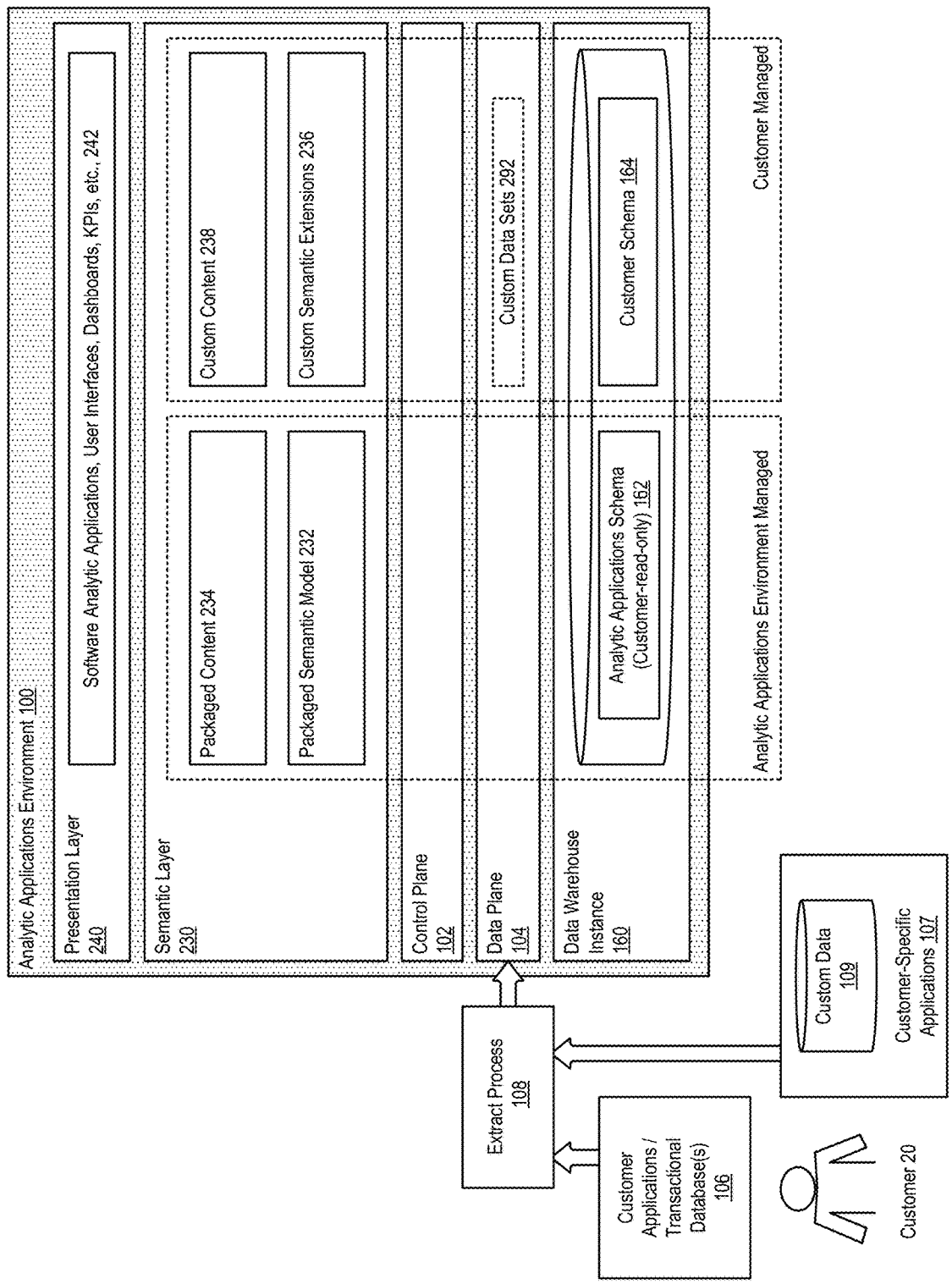
FIG. 12 illustrates a self-service data model, in accordance with an embodiment.

FIG. 12 illustrates a self-service data model, in accordance with an embodiment.

As illustrated in FIG. 12, in accordance with an embodiment, a self-service data model or scenario enables customers to load external or custom data as custom data sets, using the ETL or other data pipelines or processes provided by the system, which provides dimensional conformance. A customer can define one or more "live" data sets populated by the system; and join the "live" and external data sets, to create combined data sets that can be queried. In this scenario, customer responsibilities generally include manual refresh of their data sets; and enforcing security of the data sets.

Figure 13:
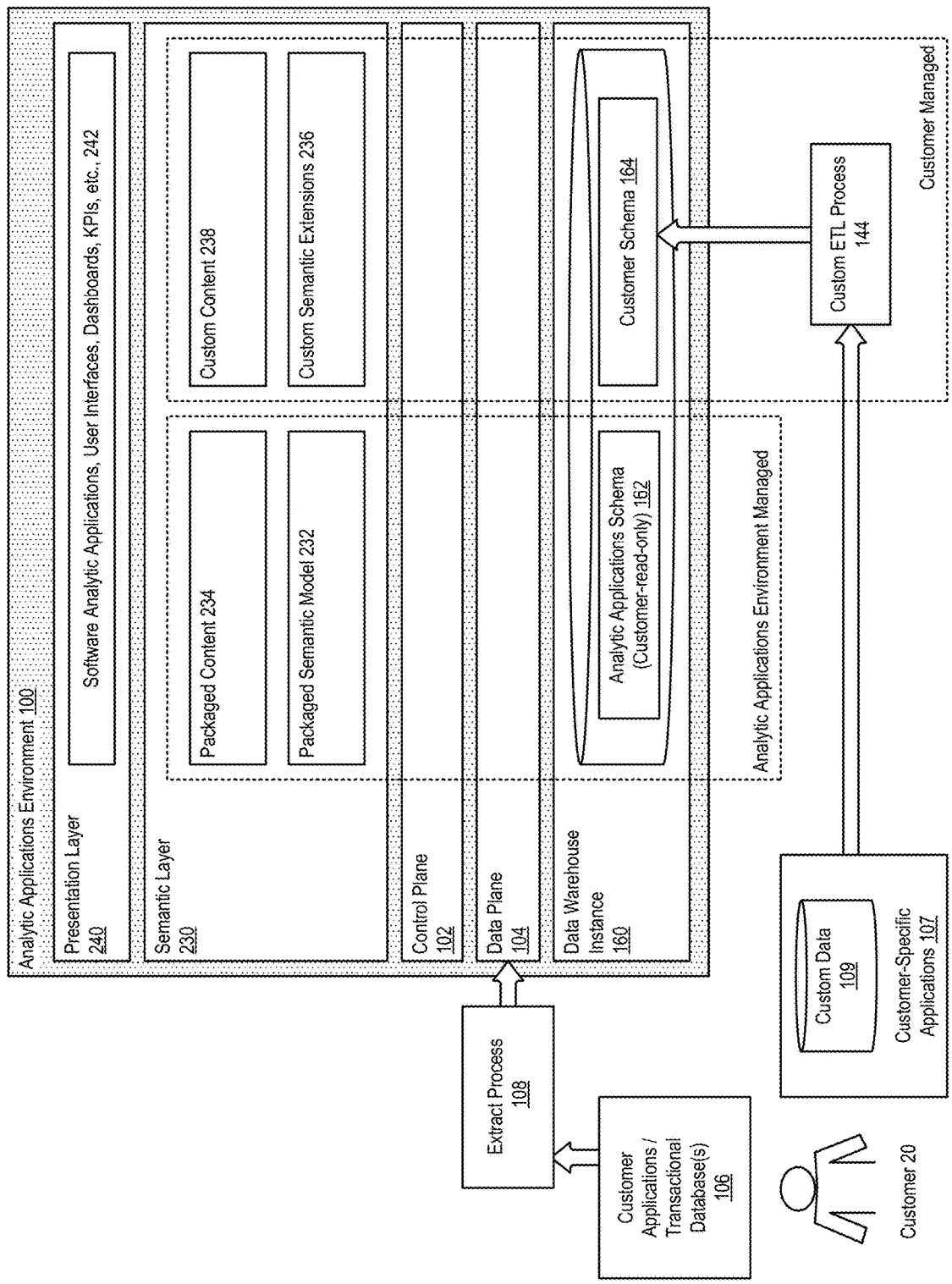
FIG. 13 illustrates a curated data model, in accordance with an embodiment.

FIG. 13 illustrates a curated data model, in accordance with an embodiment.

As illustrated in FIG. 13, in accordance with an embodiment, a curated data model or scenario provides a centralized or managed analytics environment, wherein an ETL or other data pipeline or process provided by the system publishes customer data to the immutable analytic application schema; while the customer onboards external or custom data to their customer schema using a custom ETL, or other data pipeline or process. The customer can create business database views combining system-managed and custom tables, and query the combined data using a tool of their choice. In this scenario, customer responsibilities generally include managing the loading and refreshing of data into their customer schema using the custom ETL or other data pipeline or process.

The above examples of curated and self-service data models or scenarios are provided by way of example. In accordance with various embodiments, the system can support other types of data models or scenarios.

Automatic Generation of BI Data Models

As described above, although increasingly there is an interest in developing software applications that leverage the use of data analytics within, for example, the context of an organization's enterprise resource planning (ERP) or other enterprise computing environments; the traditional approaches to preparing BI data models are less successful when addressing the complex schemas used in modern enterprise computing environments.

For example, different enterprise customers may have particular requirements with regard to how their data should be classified, aggregated, or transformed, for purposes of providing key performance indicators, data analytics, or other types of business intelligence data. For example, a customer may elect to modify the data source model associated with their data, for example by adding custom facts or dimensions.

In accordance with various embodiments, to support different customer requirements, the system can include a semantic layer that enables the use of custom semantic extensions to extend a semantic data model (semantic model), and provide custom content at a presentation layer. The semantic layer can include a physical layer that maps to a physical data model or data plane; a logical layer that operates as a mapping or transformation layer where calculations can be defined; and a presentation layer that enables a user to access the data as content.

For example, in accordance with an embodiment, a semantic model extension process can introspect a customer's data stored, for example, in a data warehouse instance, and evaluate metadata associated with the customer data to determine custom facts, custom dimensions, and/or other types of data source model extensions to extend or otherwise customize a semantic model in accordance with the customer's requirements.

In some environments, a customer may also use a BI product or environment such as, for example, Oracle Net-Suite—which generally provides an ERP computing environment targeted at mid-sized to large enterprises that supports front-office and back-office processes, such as, for example, financial management, revenue management, fixed assets, order management, billing, and inventory management—which may have additional requirements and require further modification of the semantic model to enable a customer's, e.g., NetSuite data, to be used within their analytics environment.

In accordance with an embodiment, described herein are systems and methods for automatic generation of business intelligence (BI) data models using data introspection and curation, as may be used, for example, with enterprise resource planning (ERP) or other enterprise computing or data analytics environments. The described approach uses a combination of manually-curated artifacts, and automatic generation of a model through data introspection, of a source data environment, to derive a target BI data model. For example, a pipeline generator framework can evaluate the dimensionality of a transaction type, degenerate attributes, and application measures; and use the output of this process to create an output target model and pipeline or load plan. The systems and methods described herein provide a technical improvement in the building of new subject areas or a BI data model within much shorter periods of time.

Generally described, in accordance with an embodiment, the system comprises a pipeline or snapshot (ETL) generator, component, or process, which is used to generate one or more maps automatically, by reference to or looking at a source model; wherein, for example, the automatic generation process can include the use of manually-curated artifacts, and automatically-determined or interpreted variables.

A semantic model (RPD) generator, generator, component, or process generates a data model for transaction types; wherein, for example, the RPD generation process can use determined dimensions and facts to generate a semantic model, e.g., as a BI Repository (RPD) file.

A security artifacts generator, component, or process overlays the generated semantic model with any required security artifacts, for example those described in the source model; wherein, for example, the security artifacts generation process can create security filters and application roles that control the data visibility.

A human readable format (HRF) generator, component, or process can be used to generate human readable format data, for subsequent use thereof, for example creating BI reports.

Figure 14:
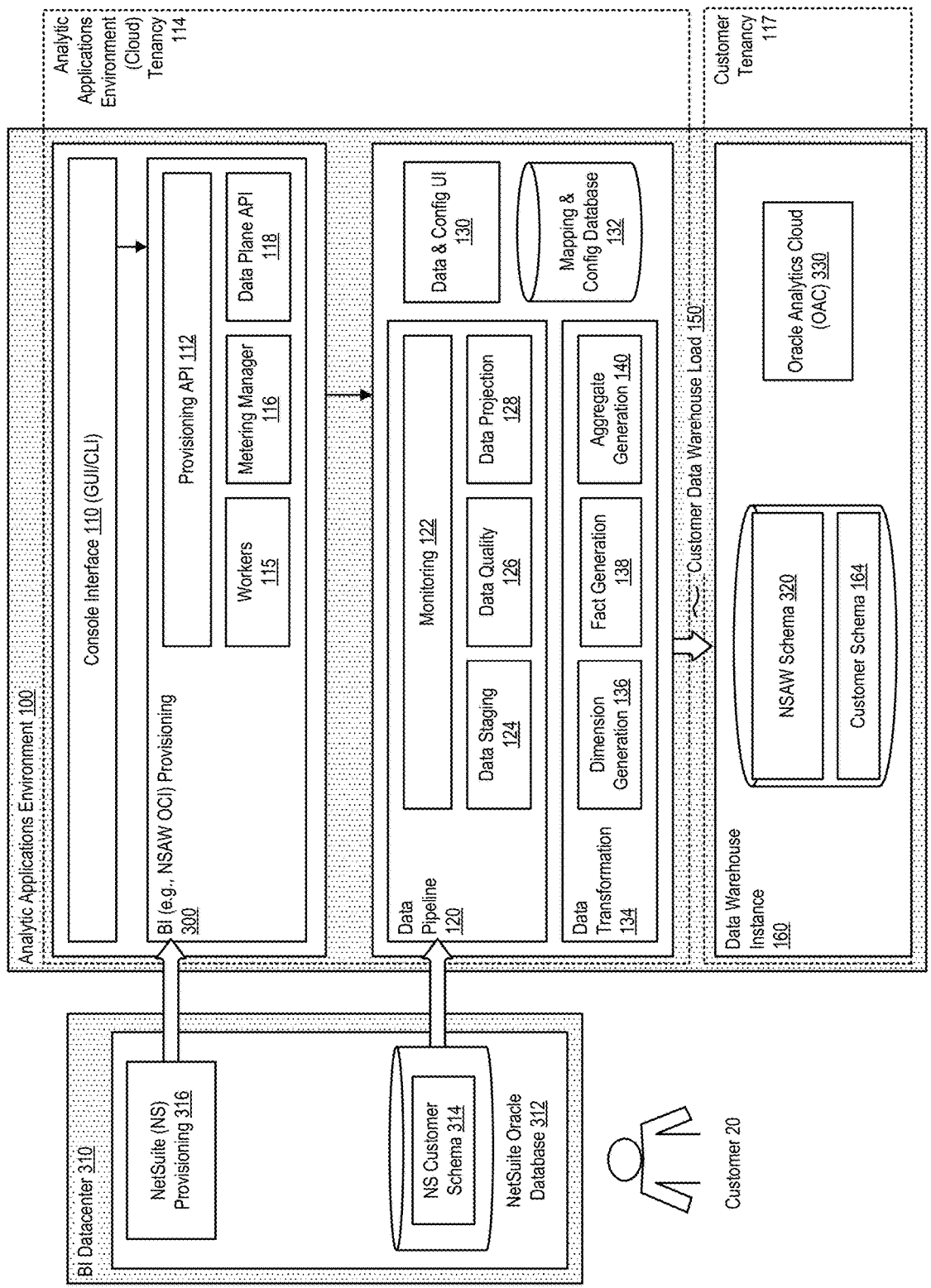
FIG. 14 illustrates a system for automatic generation of BI data models, using data introspection and curation, in accordance with an embodiment.

FIG. 14 illustrates a system for automatic generation of BI data models, using data introspection and curation, in accordance with an embodiment.

As illustrated in FIG. 14, in accordance with an embodiment, a customer may use a BI environment such as, for example, Oracle NetSuite, provided at a BI datacenter 310, and including in this example a NetSuite Oracle database 312, having a NetSuite (NS) customer schema 314, and a provisioning component 316 that enables the customer's, e.g., NetSuite data, to be provided to the analytic applications environment.

In accordance with an embodiment, at the analytic applications environment, a BI provisioning component 300 enables the customer's (e.g., NetSuite or other BI or ERP environment) data, to be received and loaded from the customer's enterprise software application or data environment, into a data warehouse instance, and associated with a customer's (e.g., NSAVV) data schema 320, wherein the semantic model can then be used to surface packaged content from the customer's source data to the presentation layer.

In accordance with an embodiment, a semantic model can be defined, for example, in an Oracle environment, as a BI Repository (RPD) file, having metadata that defines logical schemas, physical schemas, physical-to-logical mappings, aggregate table navigation, and/or other constructs that implement the various physical layer, business model and mapping layer, and presentation layer aspects of the semantic model.

In accordance with an embodiment, a customer may perform modifications to their data source model, or their NetSuite or other BI or ERP product or environment, to support their particular requirements, for example by adding custom facts or dimensions associated with the data stored in their data warehouse instance; and the system can extend the semantic model accordingly.

For example, in accordance with an embodiment, the system can use a semantic model extension process to programmatically introspect a customer's data and determine custom facts, custom dimensions, or other customizations or extensions that have been made to the data source model, and then use an appropriate flow to automatically modify or extend the semantic model to support those customizations or extensions.

Figure 15:
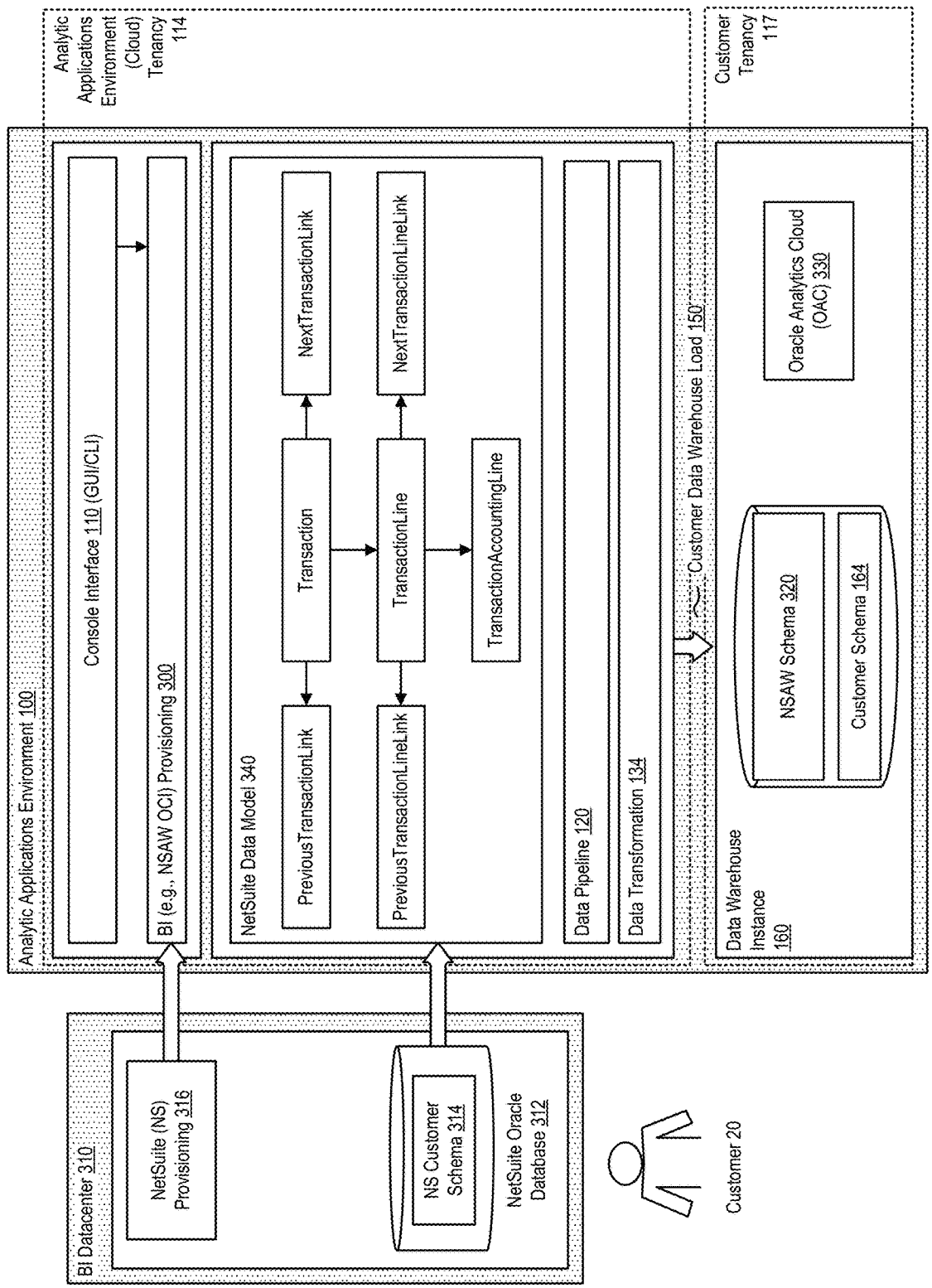
FIG. 15 further illustrates a system for automatic generation of BI data models, using data introspection and curation, in accordance with an embodiment.

FIG. 15 further illustrates a system for automatic generation of BI data models, using data introspection and curation, in accordance with an embodiment.

Some ERP or other enterprise computing or BI environments, such as, for example, NetSuite, utilize a data model whereby different modules, e.g., sales or purchases orders modules, may use different transaction tables for storage of data.

In accordance with an embodiment, when the analytic applications environment is used with a BI provisioning component that enables NetSuite data to be received into the system, a NetSuite data model 340 can be used to map the NetSuite data model that includes various business entities stored in a single set of transaction tables.

Generally described, the transaction tables in a NetSuite environment are striped by a field called transactionType, which stores and indication of which kind of entity that record is representing. The transaction tables have the superset of all the columns and attributes required for all of transaction types, and only the columns relevant for a transaction are stored in the respective records. For example, a Purchase Order transaction will have the vendor column populated, but customer as nulls; and Sales Order will have the reverse.

Given this network of transaction tables, it is possible to determine a list of applicable dimensions and attributes by introspecting the data in various fields, to determine, for example:

Purchase Order: This may include applicable dimensions such as, for example, Vendor, Time, Item, Subsidiary.

Sales Order: This may include applicable dimensions such as, for example, Customer, Time, Item, Subsidiary.

Given the list of applicable dimensions and attributes, a data model, pipeline and semantic model can be constructed for that, e.g., star schema.

Initial Curation: While the various star schemas along with pipeline and semantic model can be constructed through introspection, the dimensions have to be seeded in the data model and the pipeline through manual curation. The code generation process also needs to be aware of the supported dimensions and the superset of dimensional attributes that can be introspected for either including, or excluding, in the model.

Security: The generator creates a default security group and security filters and application roles for controlling the security filters for each subject area. The customer can then assign particular user membership to an enterprise role, and the security filters will automatically be activated in the semantic model, limiting the visibility to the assigned set of rows for that user.

Pipeline Generator Framework

Figure 16:
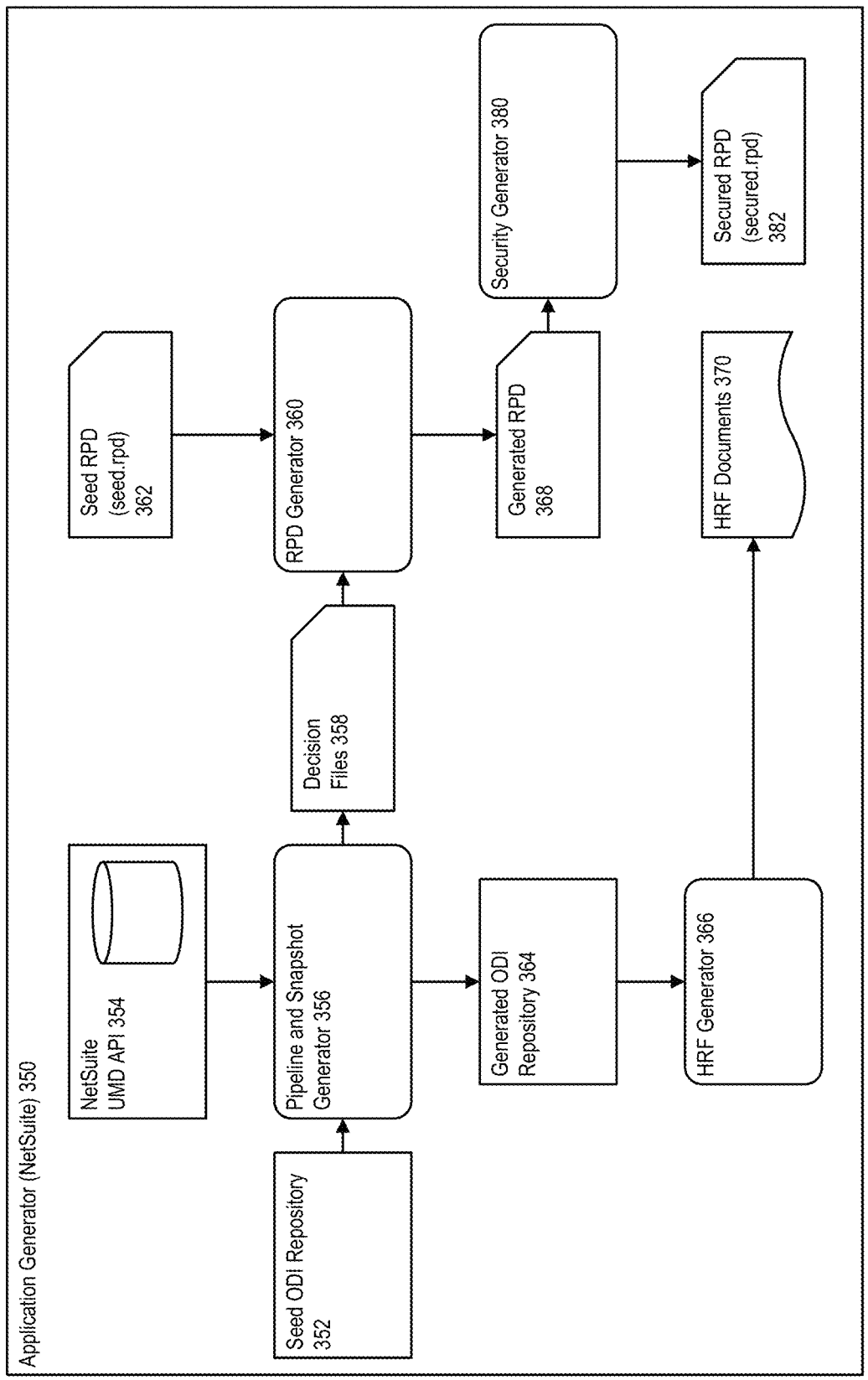
FIG. 16 illustrates an example pipeline generator framework, for use in automatic generation of BI data models, in accordance with an embodiment.

FIG. 16 illustrates an example pipeline generator framework, for use in automatic generation of BI data models, in accordance with an embodiment.

As illustrated in FIG. 16, in accordance with an embodiment, the pipeline generator framework can perform a process to create an output target model and pipeline or load plan, including, for example:

A seed (e.g., ODI) repository 352, which provides seeded dimensions associated with the data model and pipeline, and provided through manual curation.

A pipeline and snapshot generator 356 which performs the processes described below to generate one or more maps automatically, by reference to or looking at a source model.

An (e.g., NetSuite UMD) API 354 which receives information from a customer's (e.g., NetSuite or other BI or ERP environment.

A generated (e.g., ODI) repository 364, which is created based on the seeded dimensions.

A human readable format (HRF) generator 366, which is adapted to generate a human readable format data, for subsequent use thereof, for example creating BI reports, or other HRF documents 370.

One or more decision files 358.

An RPD generator 360 adapted to generate a data model for transaction types; wherein, for example, the rpd generation process can use determined dimensions and facts to generate a semantic model, e.g., as a BI repository (RPD) file; based on a seed rpd (seed.rpd) 362; and providing as output a generated RPD 368.

A security generator 380 adapted to overlay the generated semantic model with any required security artifacts, for example those described in the source model; wherein, for example, the security artifacts generation process can create security filters and application roles that control the data visibility; and prepare a secured RPD (secured.rpd) 382

In accordance with an embodiment, the pipeline generator framework can include a plurality of components or functions, for example:

1. Pipeline Generation

In accordance with an embodiment, a pipeline or snapshot (ETL) generator, component, or process is used to generate one or more maps automatically, by reference to or looking at a source model.

For example, the automatic generation process can include the use of manually-curated artifacts, and automatically-determined or interpreted variables. A seed repository includes manually-curated artifacts, such as, for example, basic dimensions associated with the environment, for use with the pipeline generator. Other transaction dimensions, columns, or security artifacts, etc., are then automatically generated by the framework.

2. Semantic Model Generation

In accordance with an embodiment, a semantic model (RPD) generator, generator, component, or process generates a data model for transaction types. For example, the RPD generation process can use determined dimensions and facts to generate a semantic model, e.g., as a BI Repository (RPD) file. It uses the outputs of the previous steps and also a template rpd xml file.

As with the above, a seed repository includes manually-curated artifacts, such as, for example, basic dimensions associated with the environment, for use with the RPD generator.

Step 1: Start processing degenerate columns—Processes the degenerate columns which are not required in the fact tables.

Step 2: Start processing unused fact columns—Process and retain only the fact or measures columns required by the transaction type.

Step 3: Start processing dimensions—Process and retain only the dimension columns required by the transaction type.

Step 4: Physical layer changes—Create the physical layer tables in the rpd.

Step 5: Start creating new subject areas objects—LTS, date dimensions, keys, measure definitions; including Step 5.1: LTS; Step 5.2: Logical tables; Step 5.3: Logical columns; Step 5.4: Logical keys; Step 5.5: Measures; Step 5.6: Logical complex joins; Step 5.7: Dimensions; Step 5.8: Logical levels.

Step 6: Start presentation changes—Create the presentation layer objects for the transaction type.

3. Security Generation

In accordance with an embodiment, a security artifacts generator, component, or process overlays the generated semantic model with any required security artifacts, for example those described in the source model. For example, the security artifacts generation process can create security filters and application roles that control the data visibility.

In accordance with an embodiment, a security artifacts generator or process overlays the generated semantic model with any required security artifacts, for example those described in the source model. In accordance with an embodiment, the above steps or processes result in the creation of a pipeline from a source data environment or system, such as, for example, a NetSuite ERP or other enterprise computing environment, to, for example, one or more BI reports. The pipeline can then be used to retrieve the data from the source data environment, following which the BI reports can be run against that retrieved data.

4. Readable Format Data Generation

In accordance with an embodiment, a human readable format (HRF) generator, component, or process can be used to generate human readable format data, for subsequent use thereof, for example creating BI reports.

For example, in an Oracle Analytics for Applications (OAX), Fusion Analytics Warehouse, or Oracle Cloud Integration (OCI) environment, the HRF generation process can generate a HRF format or mapping format used, e.g., by an OAX team, to manage an ODI repository. In accordance with an embodiment, a human readable format (HRF) generator or process can be used to generate human readable format data, for subsequent use thereof.

Figure 17:
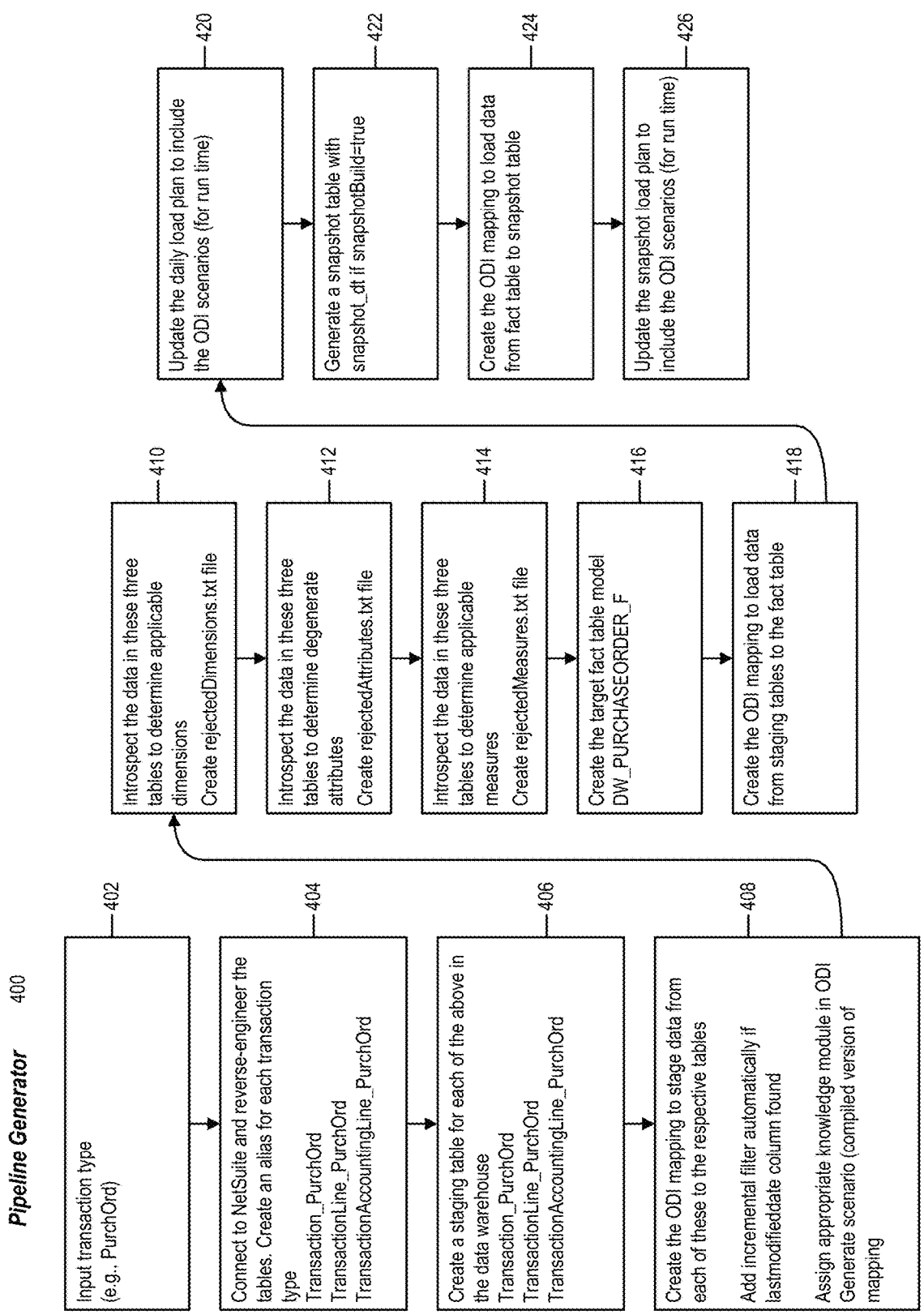
FIG. 17 illustrates an example flowchart of a process for use in automatic generation of BI data models, in accordance with an embodiment.

FIG. 17 illustrates an example flowchart of a process for use in automatic generation of BI data models, in accordance with an embodiment.

As illustrated in FIG. 17, in accordance with an embodiment 400, upon determination of an input transaction type (e.g. a sales orders transaction type), the process can access the corresponding, e.g., NetSuite table, and introspect or look at the data in those tables, to determine a dimensionality and attributes, and generate a target model and load plan.

For example, at step 402, an input transaction type is received (e.g., PurchOrd).

At step 404, the system connects to a NetSuite or other BI or ERP environment and reverse-engineer the tables found therein, and create an alias for each transaction type, for example: transaction purchase order (Transaction_PurchOrd); transaction line purchase (Transaction Line_PurchOrd); and transaction accounting line (TransactionAccountingLine_PurchOrd).

At step 406, the system create a staging table for each of the above in the data warehouse, for example: Transaction_PurchOrd; Transaction Line_PurchOrd; and TransactionAccountingLine_PurchOrd.

At step 408, the system creates the ODI mapping to stage data from each of these to the respective tables, including for example, adding an incremental filter automatically if a last modified data (lastmodifieddate) column is found; assigning appropriate knowledge module in ODI; and generate scenario (compiled version of mapping).

At step 410, the system introspects the data in these three tables to determine applicable dimensions, and creates a rejectedDimensions.txt file.

At step 412, the system introspects the data in these three tables to determine degenerate attributes, and creates a rejectedAttributes.txt file.

At step 414, the system introspect the data in these three tables to determine applicable measures, and creates a rejectedMeasures.txt file.

At step 416, the system create the target fact table model, for example DW_PURCHASEORDER_F.

At step 418, the system creates the ODI mapping to load data from staging tables to the fact table.

At step 420, the system updates the daily load plan to include the ODI scenarios (for run times).

At step 422, the system generates a snapshot table with snapshot_dt if snapshotBuild=true.

At step 424, the system creates the ODI mapping to load data from fact table to snapshot table.

At step 426, the system updates the snapshot load plan to include the ODI scenarios (for run time).

Figure 18:
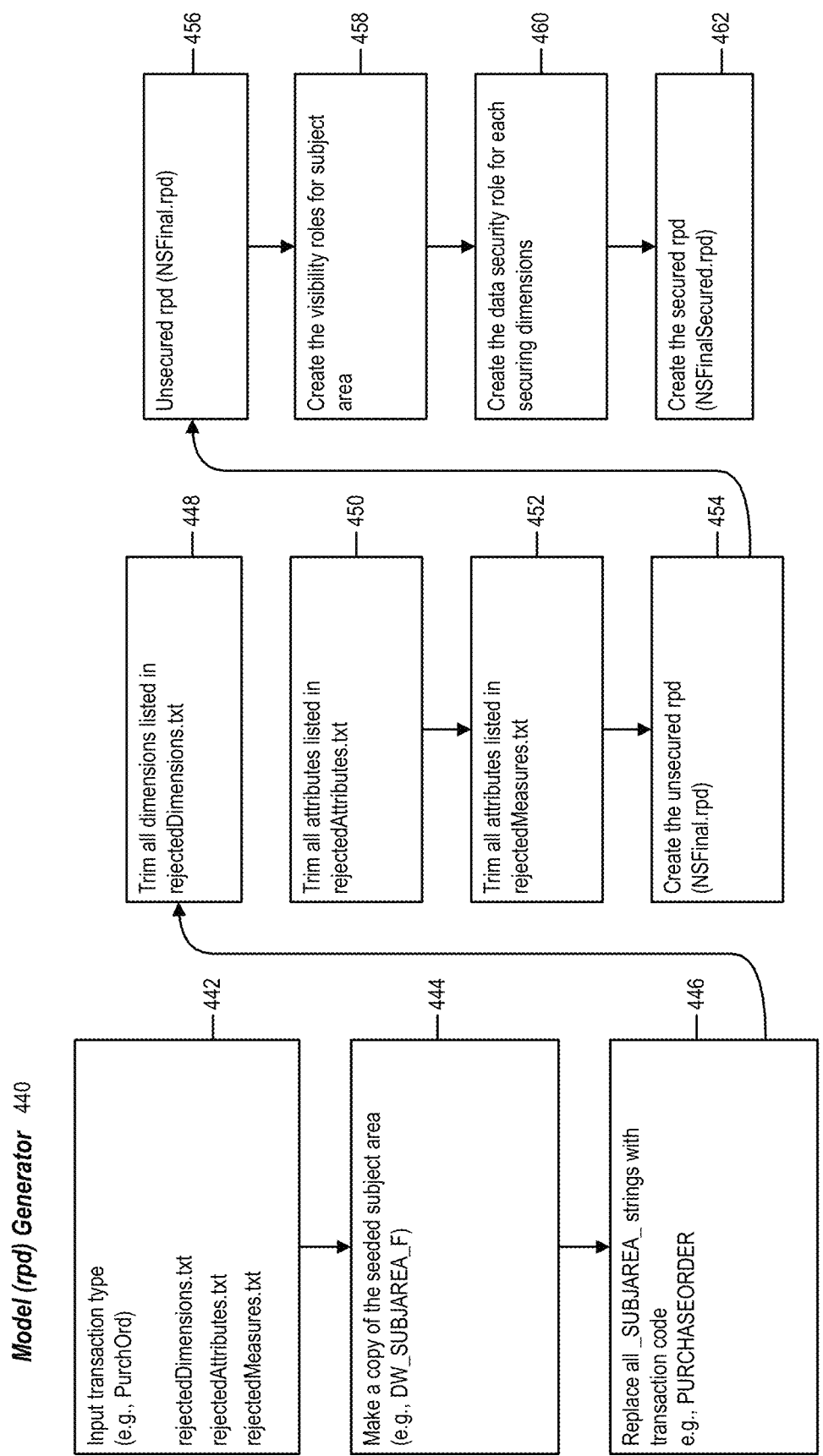
FIG. 18 further illustrates an example flowchart of a process for use in automatic generation of BI data models, in accordance with an embodiment.

FIG. 18 further illustrates an example flowchart of a process for use in automatic generation of BI data models, in accordance with an embodiment.

As illustrated in FIG. 18, in accordance with an embodiment 440, upon determination of an input transaction type, and having introspected the data as described above to determine the dimensions and attributes for the transaction type, the process can access, for example, a template star schema and create an appropriate, e.g. sales order star schema, by reference to or looking at the introspection data.

At step, 442, and input transaction type is received (e.g., PurchOrd), for example, rejected Dimensions.txt; rejectedAttributes.txt; and rejectedMeasures.txt, as described above.

At step 444, the system makes a copy of the seeded subject area, e.g., (DW_SUBJAREA_F).

At step 446, the system replaces (in this example) all_SUBJAREA_strings with transaction code, e.g., PURCHASEORDER.

At step 448, the system trims all dimensions listed in rejectedDimensions.txt.

At step 450, the system trim all attributes listed in rejectedAttributes.txt.

At step 452, the system trim all attributes listed in rejectedMeasures.txt.

At step 454, the system create the unsecured rpd, for example (NSFinal.rpd).

At step 456, the system creates an unsecured rpd (NSFinal.rpd).

At step 458, the system creates the visibility roles for subject area.

At step 460, the system create the data security role for each securing dimensions.

At step 462, the system create the secured rpd (NSFinalSecured.rpd).

In accordance with an embodiment, as further illustrated in FIG. 18, the security artifacts generator can then be used, for example, to create appropriate visibility roles or data security roles for each secured dimension.

In accordance with an embodiment, the described approach uses a combination of manual model curation, and automatic generation through data introspection, of a source data environment, to derive a target BI data model; and provides a technical improvement in the building of new subject areas or a BI data model within much shorter periods of time. The various steps, components, or processes described above can be provided as software or program code executable by a computer system or other type of processing device.

Example Pipeline Generator Inputs

In accordance with various embodiments, examples of inputs to the pipeline generator are illustrated and described below:

1. List of Transaction Types

FIG. 19 illustrates an example list of transaction types, in accordance with an embodiment.

As illustrated in FIG. 19, in accordance with an embodiment, a list of transaction types 510 can be captured in a file, for example as a subjectArea.csv. This file is used to control the transaction types processed in the run, a short name, business friendly name and the security group the transaction type belongs to.

2. Transaction Column List

FIG. 20 illustrates an example transaction column list, in accordance with an embodiment.

As illustrated in FIG. 20, in accordance with an embodiment, a transaction column list 520 can be provided as an input file that is a static file that captures the list of all columns in the transaction tables, whether they are to be treated as fact or dimension or a measure. This file can be updated once every release if, for example, the BI/ERP system adds or deletes a new set of columns.

3. Dimension to Logical Dimension Map

Figure 21:
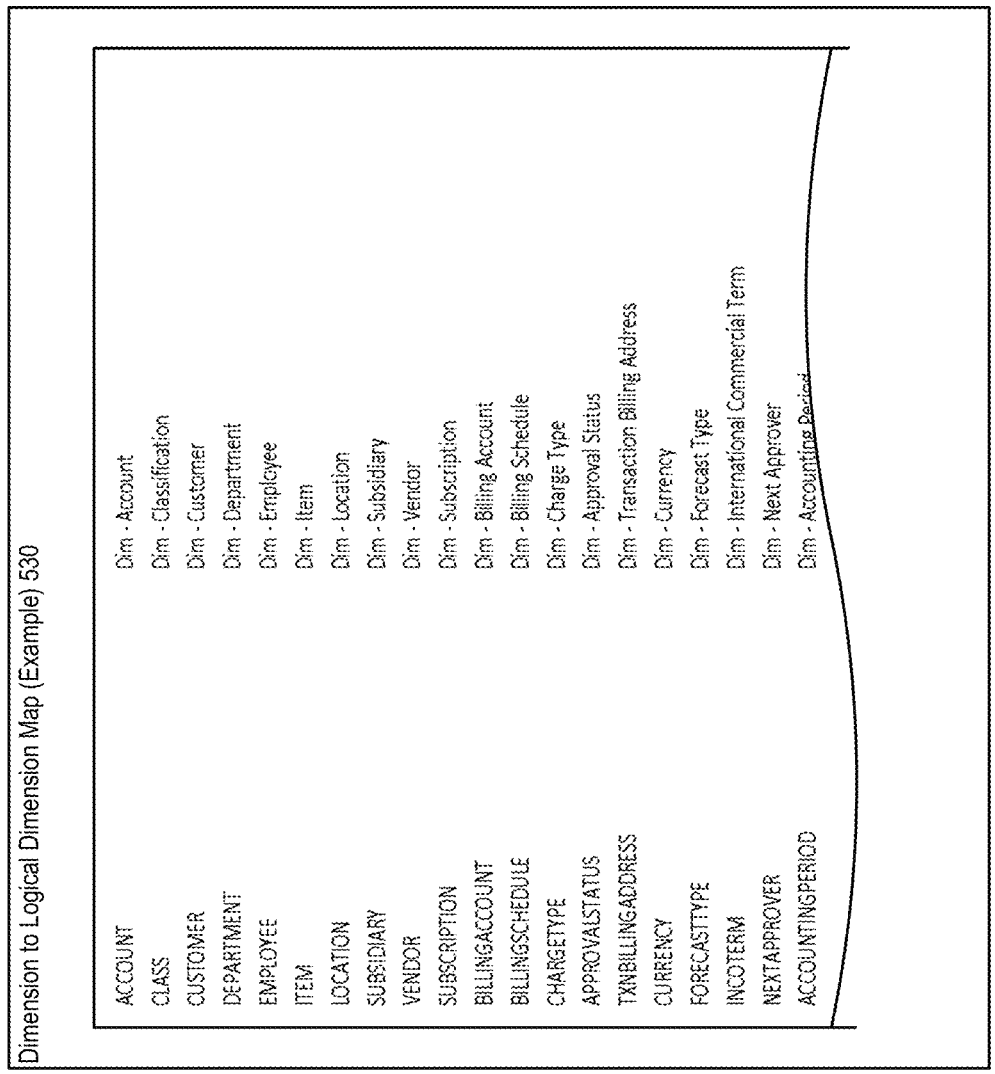
FIG. 21 illustrates an example dimension to logical dimension map, in accordance with an embodiment.

FIG. 21 illustrates an example dimension to logical dimension map, in accordance with an embodiment.

As illustrated in FIG. 21, in accordance with an embodiment, a dimension to logical dimension map 530 can be provided as a file that provides the logical names for all the dimensions used in the model.

4. Physical to Logical Attributes Map

Figure 22:
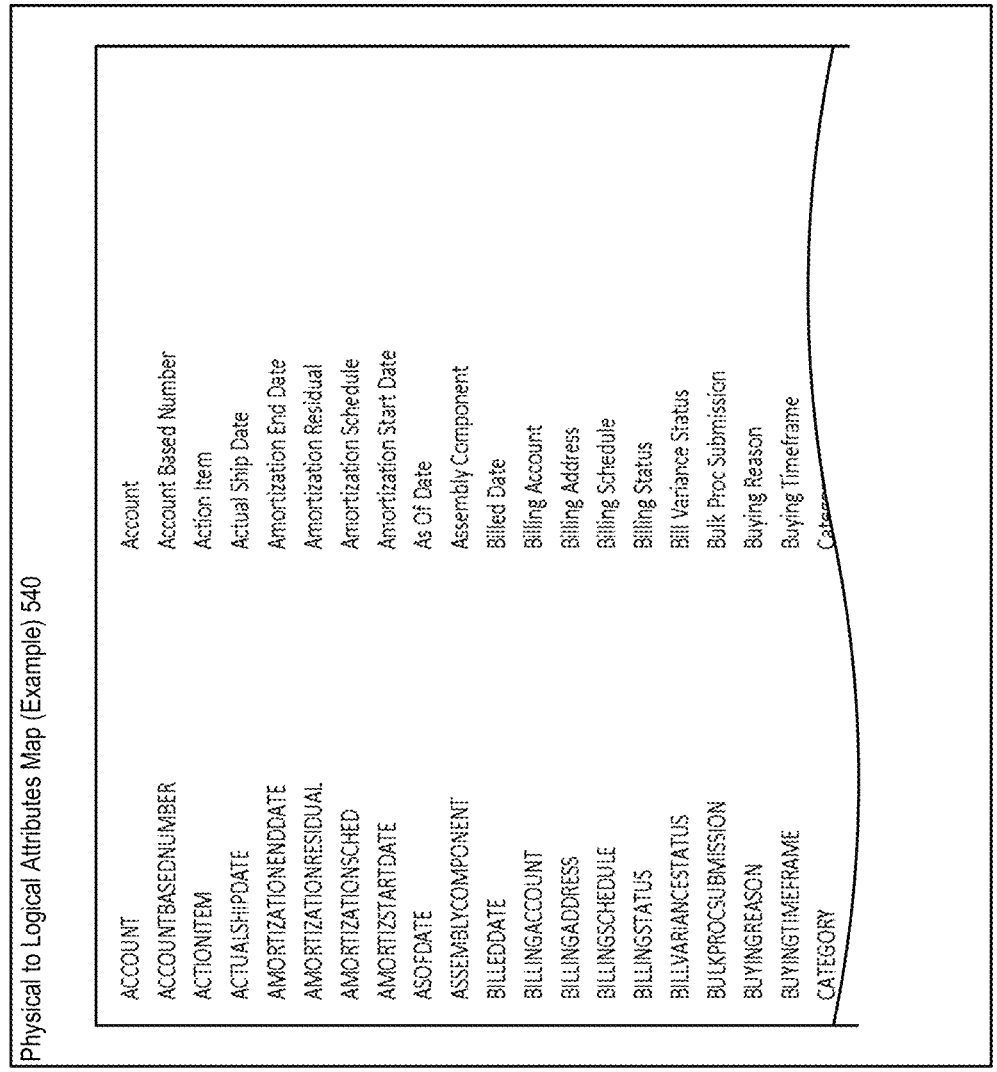
FIG. 22 illustrates an example physical to logical attributes map, in accordance with an embodiment.

FIG. 22 illustrates an example physical to logical attributes map, in accordance with an embodiment.

As illustrated in FIG. 22, in accordance with an embodiment, a physical to logical attributes map 540 can be provided as a file that provides the logical names for the physical attributes in the transaction tables. The logical names are used in the semantic model.

5. Physical to Logical Measures Map

Figure 23:
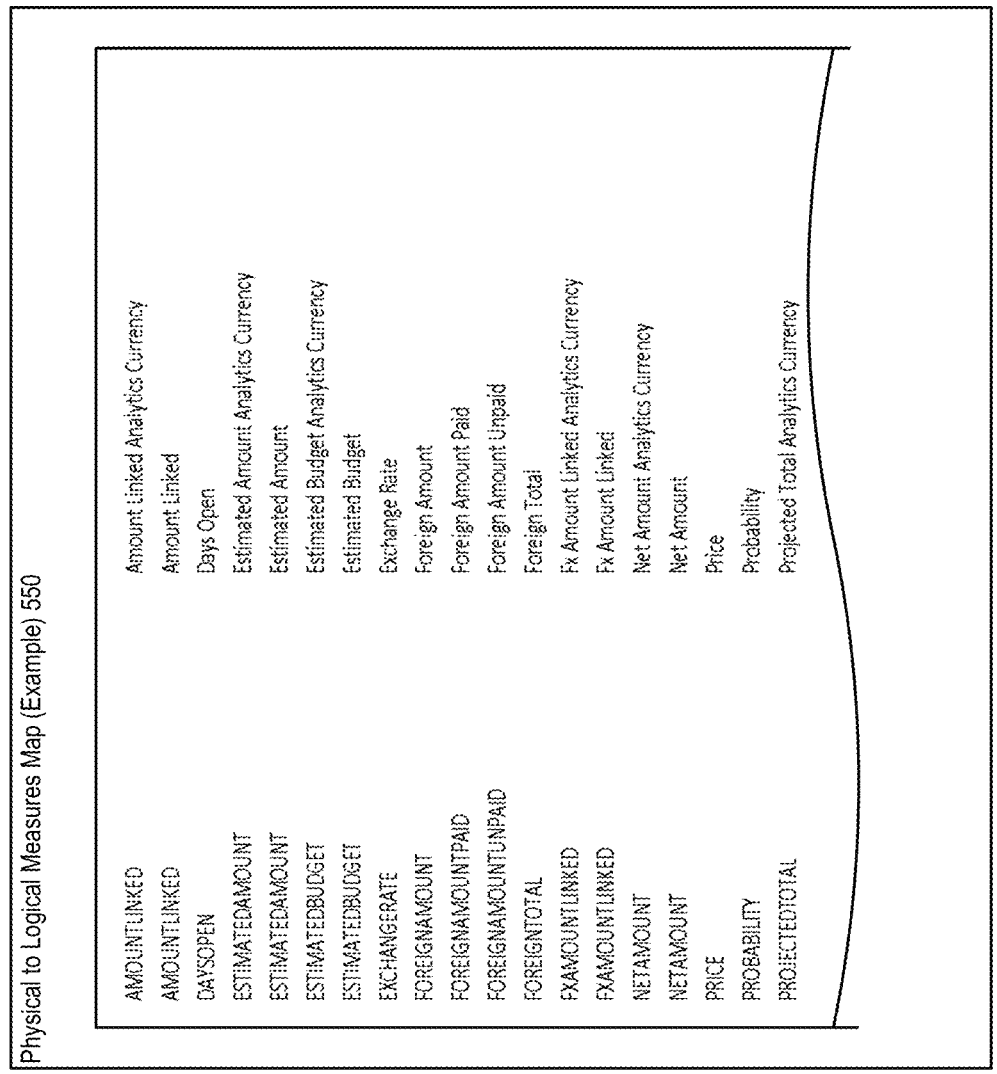
FIG. 23 illustrates an example physical to logical measures map, in accordance with an embodiment.

FIG. 23 illustrates an example physical to logical measures map, in accordance with an embodiment.

As illustrated in FIG. 23, in accordance with an embodiment, a physical to logical measures map 550 can be provided as a file that provides the logical names for the physical measures in the transaction tables. The logical names are used in the semantic model.

6. Template Semantic Model

In accordance with an embodiment, a template semantic model has the definition of all the curated dimensions and a sample fact table which is used as a model to created semantic model for specific transaction types.

7. Template ODI Repository

In accordance with an embodiment, a template ODI repository has the definition of all the curated dimensions and is used to created ODI repository model for specific transaction types.

Example User Interfaces for Automatic Generation of BI Data Models

Figure 24:
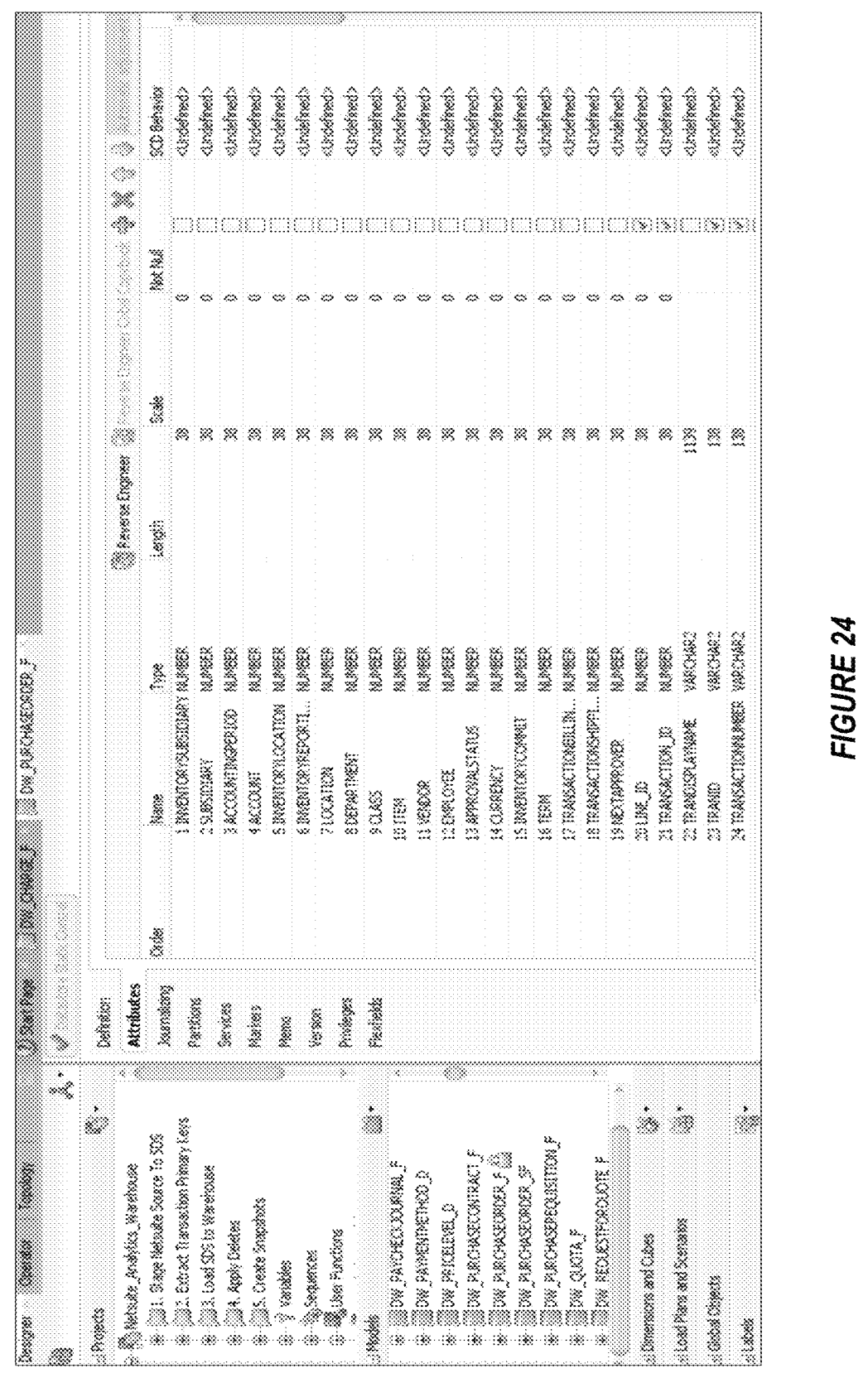

In accordance with various embodiments, FIGS. 24-31 illustrate examples of users interfaces associated with automatic generation of BI data models, for example:

FIG. 24 illustrates an example user interface for use with a system for automatic generation of BI data models, in accordance with an embodiment.

Figure 25:
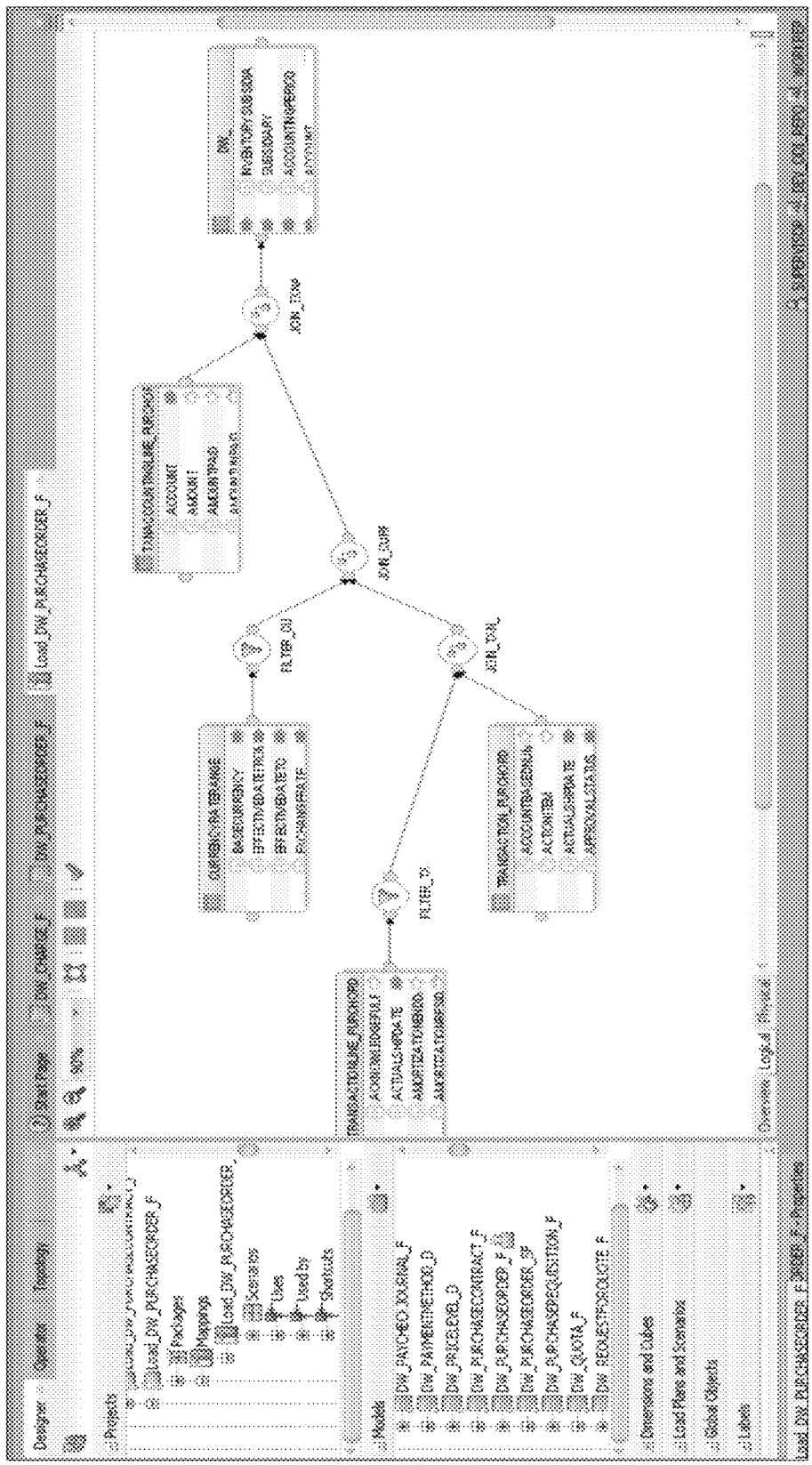
FIG. 25 illustrates an example user interface for use with a system for automatic generation of BI data models, in accordance with an embodiment.

FIG. 25 illustrates an example user interface for use with a system for automatic generation of BI data models, in accordance with an embodiment, including a display of packages.

Figure 26:
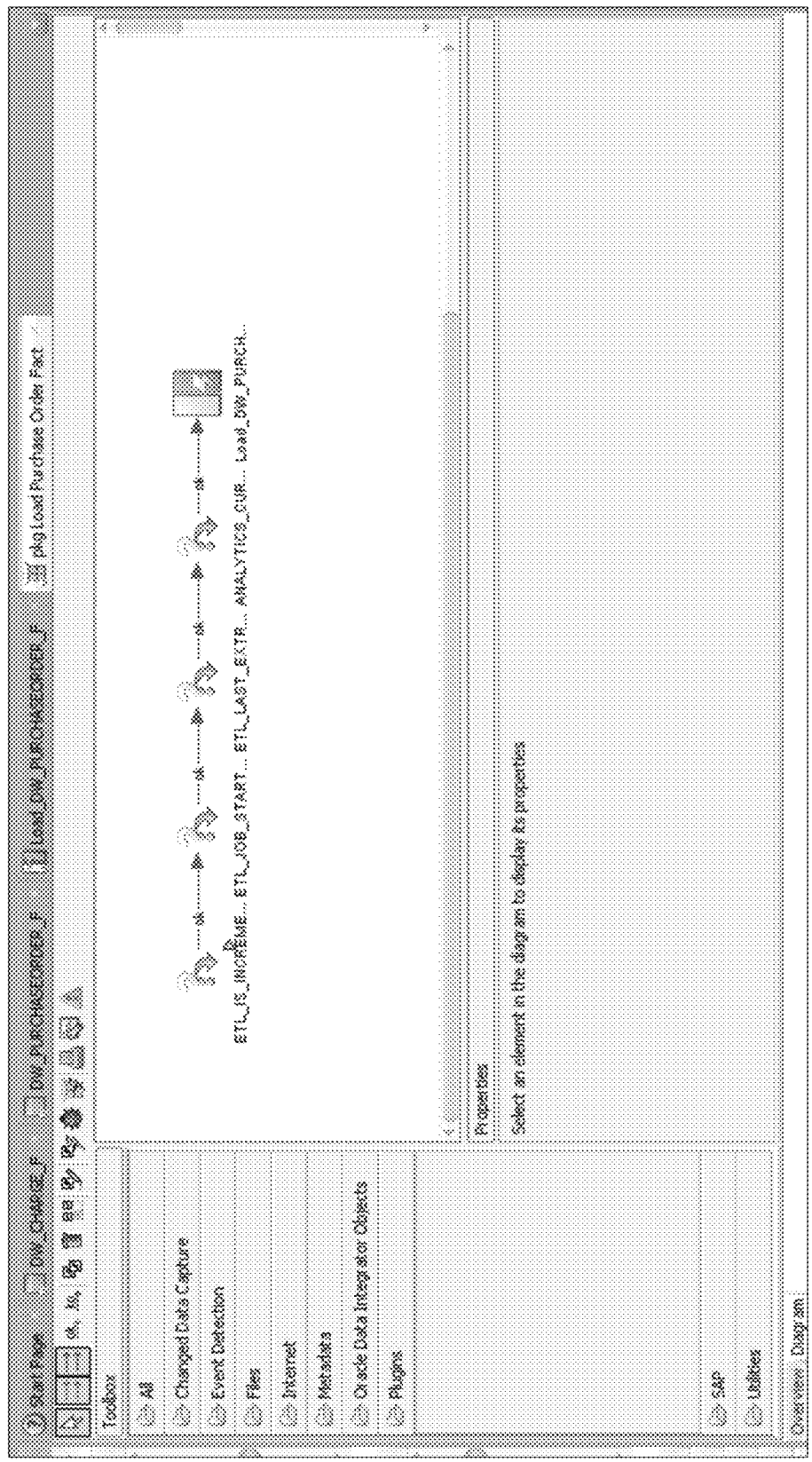
FIG. 26 illustrates an example user interface for use with a system for automatic generation of BI data models, in accordance with an embodiment.

FIG. 26 illustrates an example user interface for use with a system for automatic generation of BI data models, in accordance with an embodiment, including a display of load plans.

Figure 27:
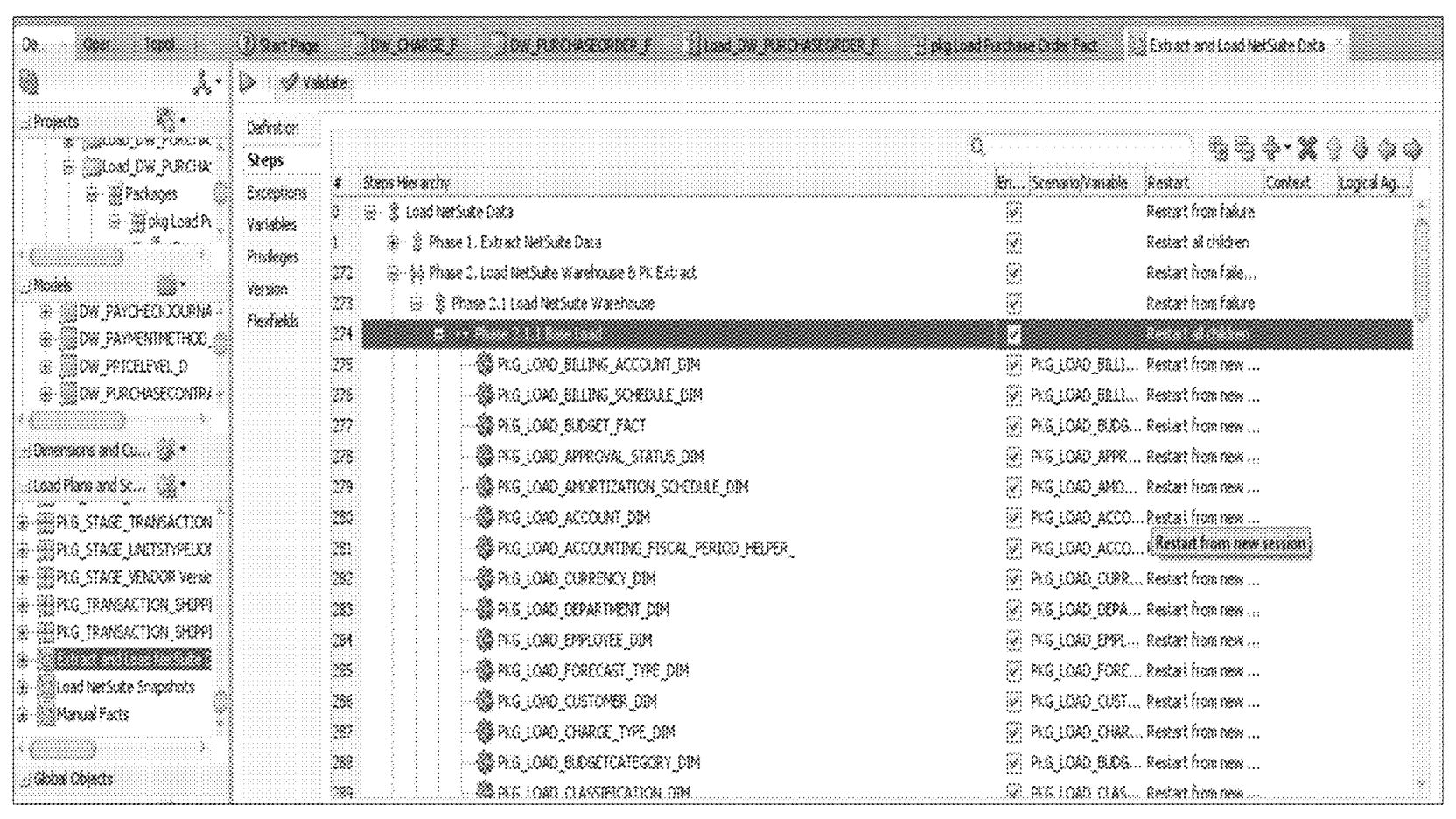

FIG. 27 illustrates an example user interface for use with a system for automatic generation of BI data models, in accordance with an embodiment, including a display of a generated rpd file.

Figure 28:
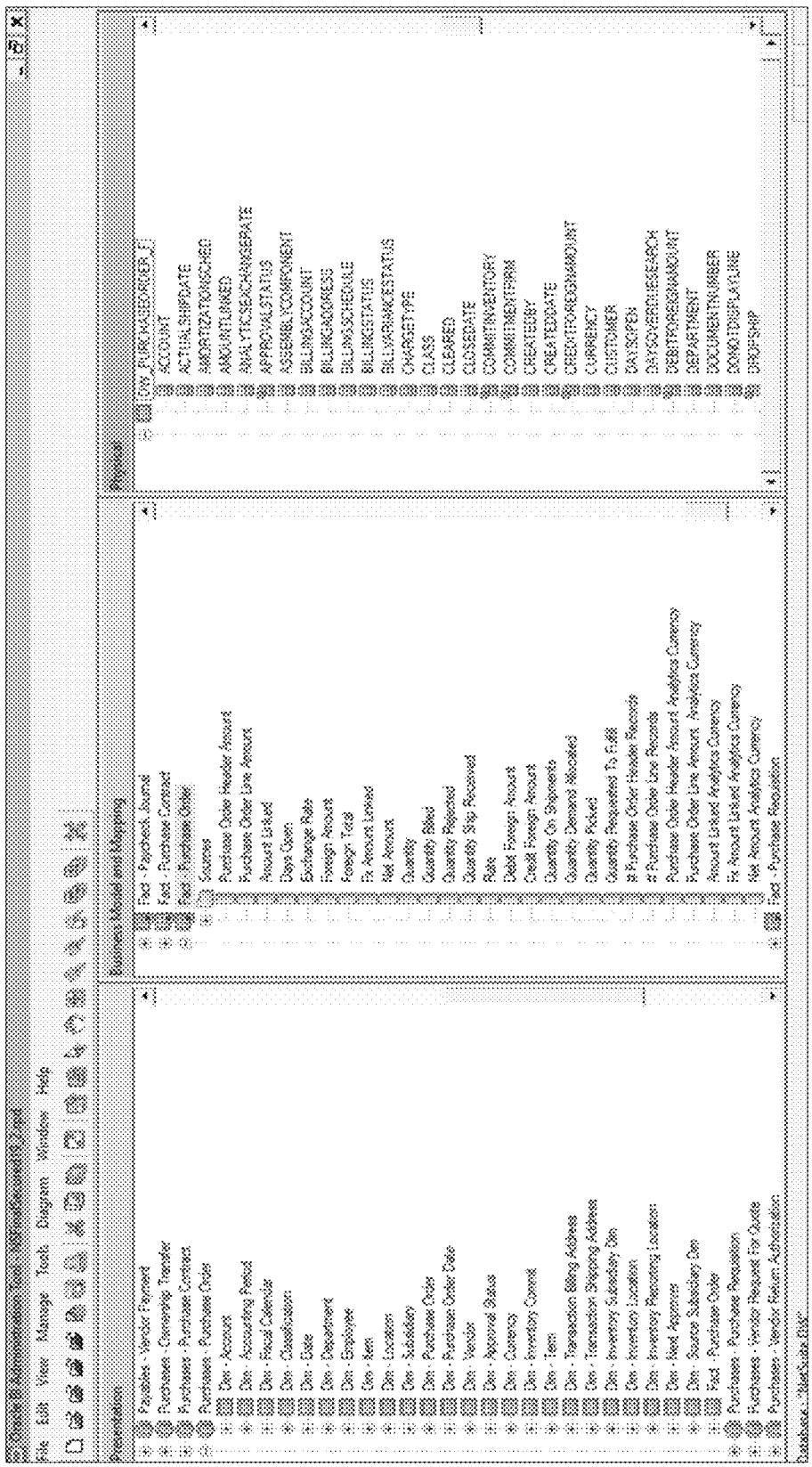
FIG. 28 illustrates an example user interface for use with a system for automatic generation of BI data models, in accordance with an embodiment.

FIG. 28 illustrates an example user interface for use with a system for automatic generation of BI data models, in accordance with an embodiment, including an example of a business model associated with the rpd file.

Figure 29:
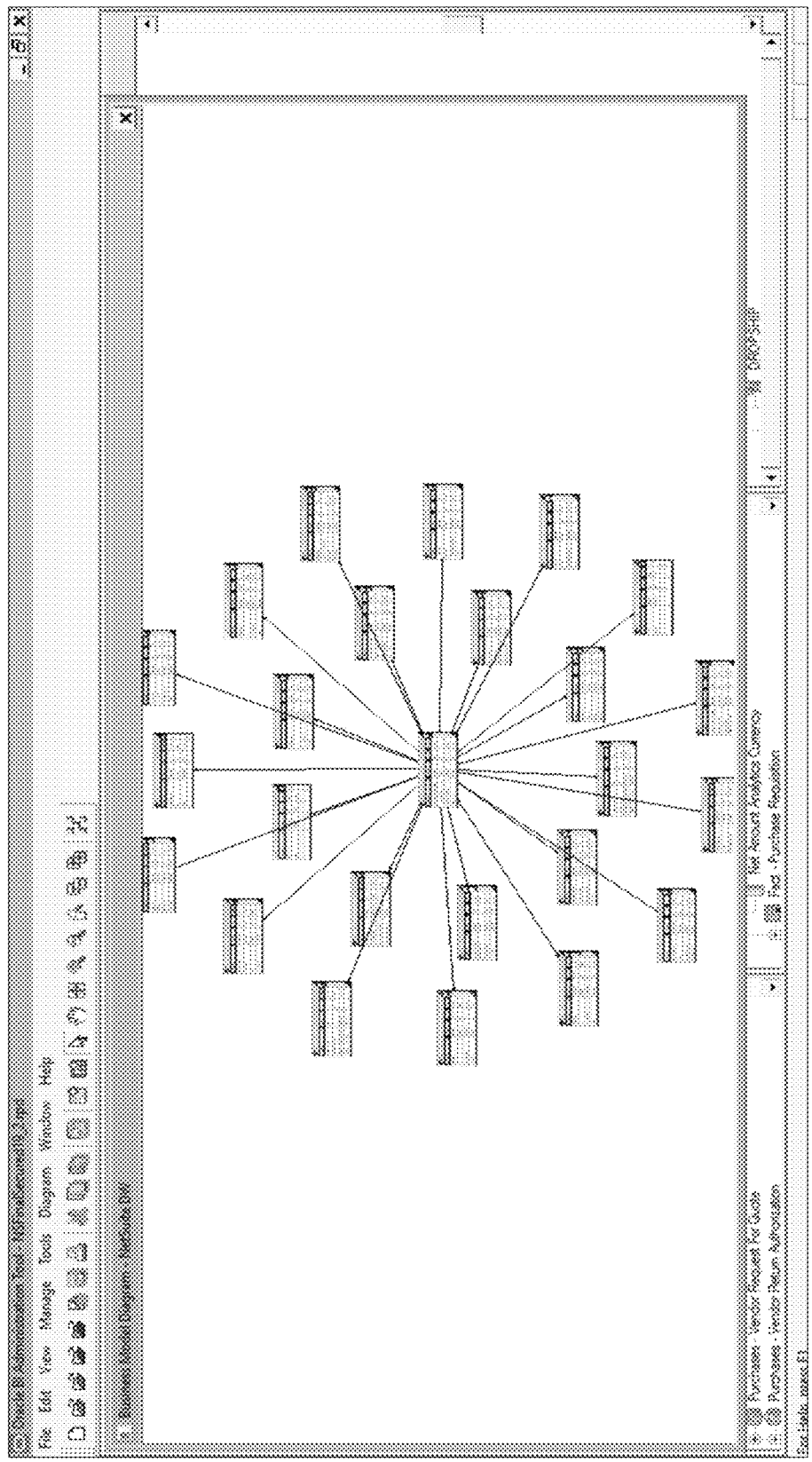
FIG. 29 illustrates an example user interface for use with a system for automatic generation of BI data models, in accordance with an embodiment.

FIG. 29 illustrates an example user interface for use with a system for automatic generation of BI data models, in accordance with an embodiment, including an example of a security filter.

Figure 30:
FIG. 30 illustrates an example user interface for use with a system for automatic generation of BI data models, in accordance with an embodiment.

FIG. 30 illustrates an example user interface for use with a system for automatic generation of BI data models, in accordance with an embodiment, including an example of displayed models.

Figure 31:
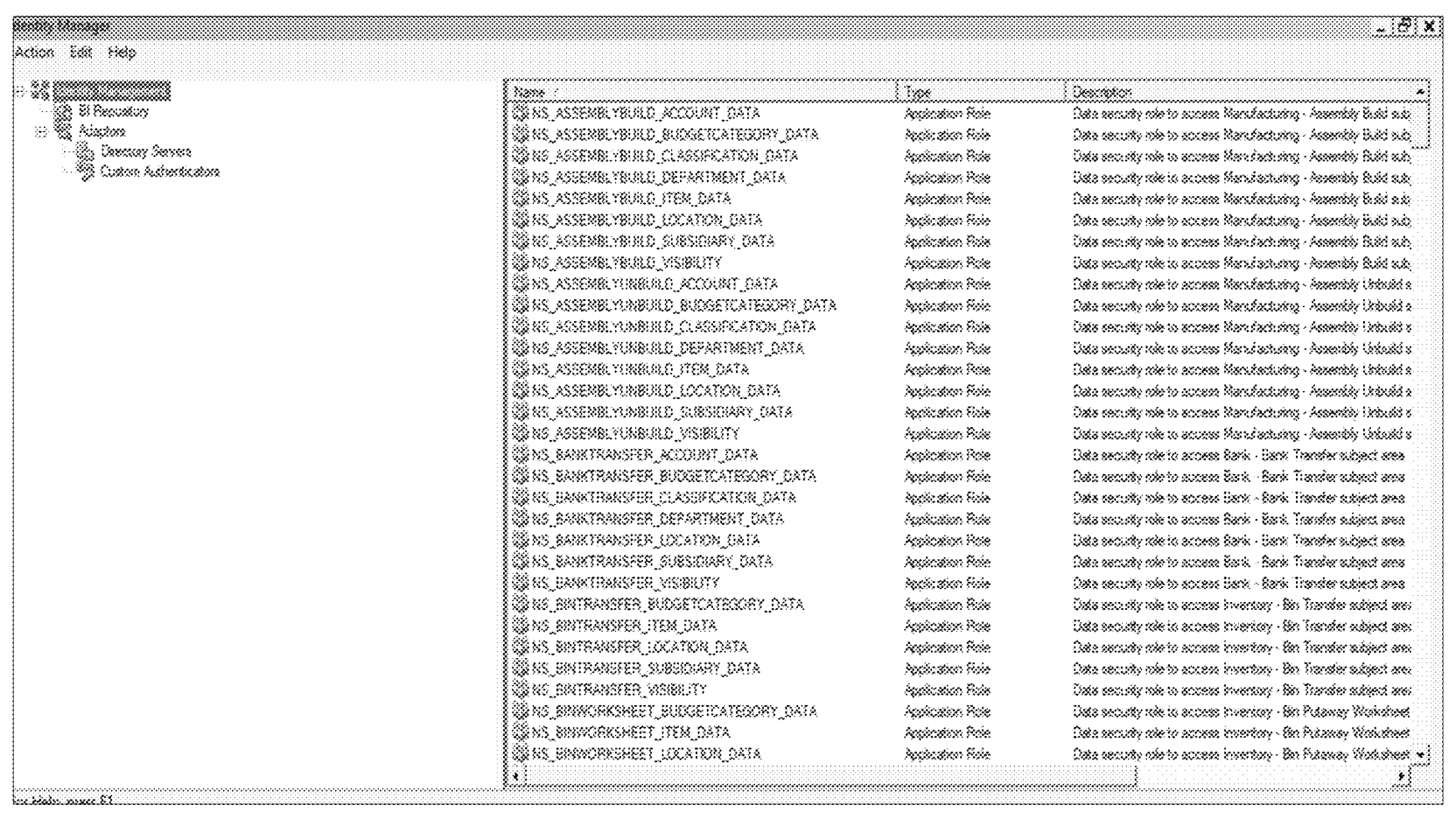

FIG. 31 illustrates an example user interface for use with a system for automatic generation of BI data models, in accordance with an embodiment, including an example of mappings.

Automatic Generation of BI Data Model Process

Figure 32:
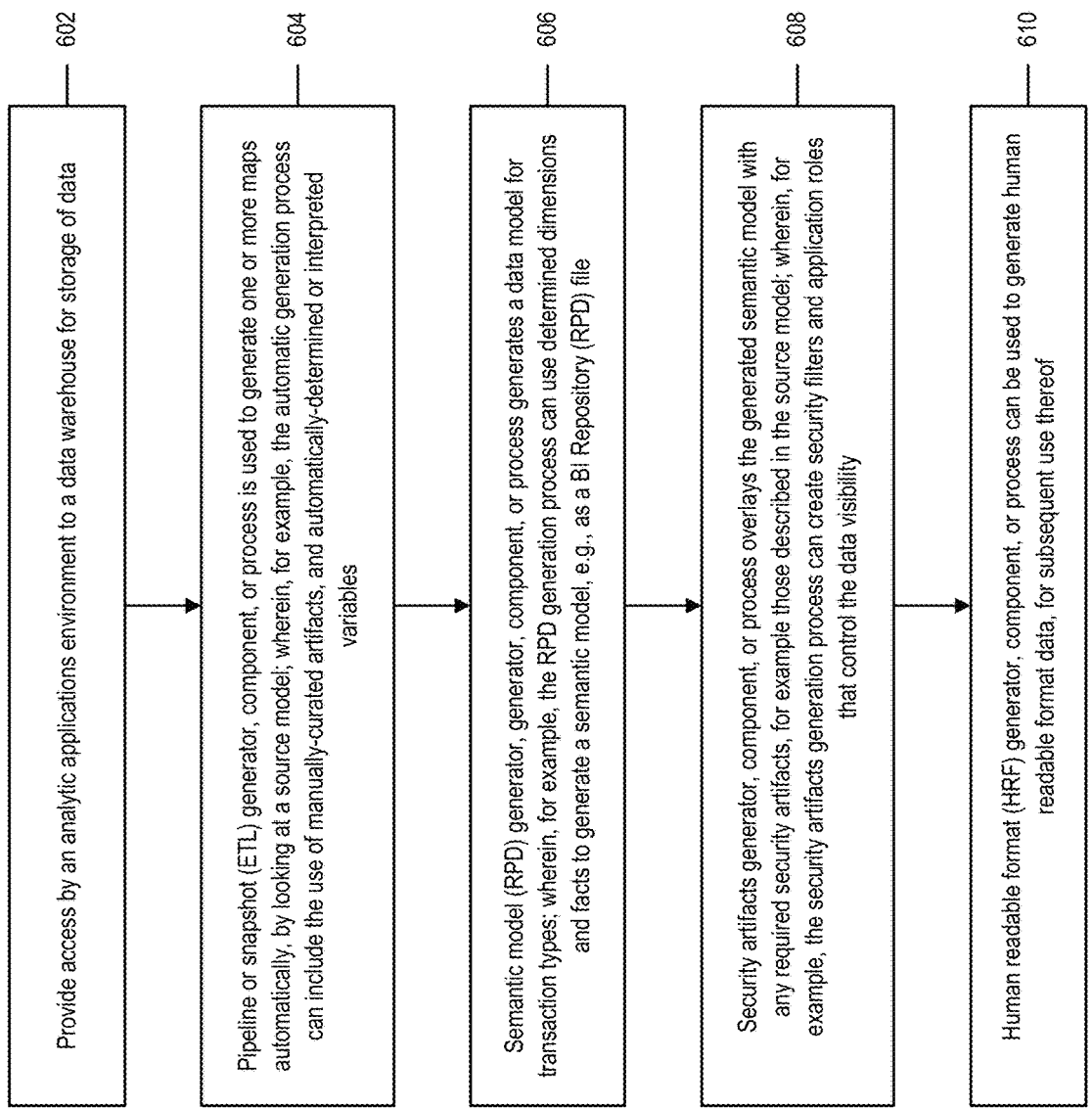
FIG. 32 illustrates a flowchart of a method for providing automatic generation of BI data models, using data introspection and curation, in accordance with an embodiment.

FIG. 32 illustrates a flowchart of a method for providing automatic generation of BI data models, using data introspection and curation, in accordance with an embodiment.

As illustrated in FIG. 32, in accordance with an embodiment, at step 602, an analytic applications environment to a data warehouse for storage of data.

At step 604, a pipeline or snapshot (ETL) generator, component, or process is used to generate one or more maps automatically, by reference to or looking at a source model; wherein, for example, the automatic generation process can include the use of manually-curated artifacts, and automatically-determined or interpreted variables.

At step 606, a semantic model (RPD) generator, generator, component, or process generates a data model for transaction types; wherein, for example, the RPD generation process can use determined dimensions and facts to generate a semantic model, e.g., as a BI Repository (RPD) file.

At step 608, a security artifacts generator, component, or process overlays the generated semantic model with any required security artifacts, for example those described in the source model; wherein, for example, the security artifacts generation process can create security filters and application roles that control the data visibility.

At step 610, a human readable format (HRF) generator, component, or process can be used to generate human readable format data, for subsequent use thereof.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although various embodiments of the systems and methods described herein illustrate usage in various enterprise resource planning (ERP) or other enterprise computing or data analytics environments such as, for example, NetSuite or Fusion Applications; various embodiments can be used with other types of ERP, cloud computing, enterprise computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for automatic generation of data models using data introspection and curation, comprising:
a computer including one or more processors, that provides access by an analytic applications environment to a data warehouse for storage of data by a plurality of tenants, wherein data associated with a tenant is provisioned in a data warehouse instance associated with the tenant in accordance with an analytic applications schema shared by the plurality of tenants, and a customer schema associated with the tenant, wherein the data warehouse instance associated with the tenant is populated with data received from the tenant's source data environment, as defined by a combination of the analytic applications schema and their customer schema;

wherein the analytic applications environment provides a data transformation layer that is used by the analytic applications environment to process a received transactional data associated with the tenant and load a transformed data into the data warehouse;

wherein the analytic applications environment provides a semantic layer that includes data defining a semantic model of the tenant's data including:
  a physical layer that maps to a physical data model;
  a logical layer that operates as a mapping and transformation layer where calculations can be defined; and
  a presentation layer that enables access to the data as content;

wherein the system provides a generator framework and semantic model extension process operable to generate automatically one or more data maps associated with the tenant's source data environment, by reference to combination of:
  a seed repository that includes curated artifacts including basic dimensions associated with the source data environment, and
  automatically-determined or interpreted variables provided by a data introspection of the source data environment and an associated source model;

said process comprising:
  generating or updating the semantic model of the tenant's data for transaction types associated with the tenant's source data environment, including determining, based on the introspection of the source data environment, dimensions and facts associated with the source data to include in the semantic model; and
  overlaying the generated semantic model with security artifacts corresponding to those described in the source model that control data visibility.

2. The system of claim 1, wherein the system performs an extract, transform, load data pipeline or process in accordance with the analytic applications schema and the customer schema associated with the tenant, to receive data from the tenant's enterprise software application or source data environment, for loading into the data warehouse instance associated with the tenant.

3. The system of claim 1, wherein generation of one or more extract, transform, load (ETL) maps includes receiving from the seed repository the curated artifacts, including basic dimensions associated with the source data environment; and
  wherein additional transaction dimensions, columns, or security artifacts, are then automatically generated by the generator framework.

4. The system of claim 1, wherein the semantic model as generated is stored as a business intelligence (BI) Repository (RPD) file.

5. The system of claim 1, wherein the source data environment is one of a NetSuite, business intelligence (BI), enterprise resource planning (ERP), cloud computing, enterprise computing, or other computing environment.

6. The system of claim 1, wherein the data warehouse is associated with an analytic applications schema;
  wherein each tenant instance of the data warehouse is populated with data received from an enterprise software application or source data environment, wherein data associated with a particular tenant of the analytic applications environment is provisioned in the data warehouse instance associated with, and accessible to, the particular tenant, in accordance with the analytic applications schema and the customer schema associated with the particular tenant;
  wherein a first customer tenancy for a first tenant comprises a first data warehouse instance, and a second customer tenancy for a second tenant comprises a second data warehouse instance.

7. The system of claim 1, wherein the curated artifacts are provided within a curated data model and first data pipeline or process that publishes a customer data to the analytic applications schema, while an external or custom data is onboarded to the customer schema using a second data pipeline or process.

8. A method for automatic generation of data models using data introspection and curation, comprising:
  providing, by a computer including one or more processors, access by an analytic applications environment to a data warehouse for storage of data by a plurality of tenants, wherein data associated with a tenant is provisioned in a data warehouse instance associated with the tenant in accordance with an analytic applications schema shared by the plurality of tenants, and a customer schema associated with the tenant, wherein the data warehouse instance associated with the tenant is populated with data received from the tenant's source data environment, as defined by a combination of the analytic applications schema and their customer schema;
  wherein the analytic applications environment provides a data transformation layer that is used by the analytic applications environment to process a received transactional data associated with the tenant and load a transformed data into the data warehouse;
  wherein the analytic applications environment provides a semantic layer that includes data defining a semantic model of the tenant's data including:
    a physical layer that maps to a physical data model;
    a logical layer that operates as a mapping and transformation layer where calculations can be defined; and
    a presentation layer that enables access to the data as content;
  generating automatically, by a semantic model extension process, one or more data maps associated with the tenant's source data environment, by reference to a combination of:
    a seed repository that includes curated artifacts including basic dimensions associated with the source data environment, and
    automatically-determined or interpreted variables provided by a data introspection of the source data environment and an associated source model;
  said process comprising:
  generating or updating the semantic model of the tenant's data for transaction types associated with the tenant's source data environment, including determining, based on the introspection of the source data environment, dimensions and facts associated with the source data to include in the semantic model; and
  overlaying the generated semantic model with security artifacts corresponding to those described in the source model that control data visibility.

9. The method of claim 8, further comprising performing an extract, transform, load data pipeline or process in accordance with the analytic applications schema and the customer schema associated with the tenant, to receive data from the tenant's enterprise software application or source data environment, for loading into the data warehouse instance associated with the tenant.

10. The method of claim 8, wherein generation of one or more extract, transform, load (ETL) maps includes receiving from the seed repository the curated artifacts, including basic dimensions associated with the source data environment; and
wherein additional transaction dimensions, columns, or security artifacts, are then automatically generated by the generator framework.

11. The method of claim 8, wherein the semantic model as generated is stored as a business intelligence (BI) Repository (RPD) file.

12. The method of claim 8, wherein the source data environment is one of a NetSuite, business intelligence (BI), enterprise resource planning (ERP), cloud computing, enterprise computing, or other computing environment.

13. The method of claim 8, wherein the data warehouse is associated with an analytic applications schema;
wherein each tenant instance of the data warehouse is populated with data received from an enterprise software application or source data environment, wherein data associated with a particular tenant of the analytic applications environment is provisioned in the data warehouse instance associated with, and accessible to, the particular tenant, in accordance with the analytic applications schema and the customer schema associated with the particular tenant;
wherein a first customer tenancy for a first tenant comprises a first data warehouse instance, and a second customer tenancy for a second tenant comprises a second data warehouse instance.

14. The method of claim 8, wherein the curated artifacts are provided within a curated data model and first data pipeline or process that publishes a customer data to the analytic applications schema, while an external or custom data is onboarded to the customer schema using a second data pipeline or process.

15. A non-transitory computer readable storage medium, including instructions stored thereon which when read and executed by one or more computers cause the one or more computers to perform a method comprising:
providing, by a computer including one or more processors, access by an analytic applications environment to a data warehouse for storage of data by a plurality of tenants, wherein data associated with a tenant is provisioned in a data warehouse instance associated with the tenant in accordance with an analytic applications schema shared by the plurality of tenants, and a customer schema associated with the tenant, wherein the data warehouse instance associated with the tenant is populated with data received from the tenant's source data environment, as defined by a combination of the analytic applications schema and their customer schema;
wherein the analytic applications environment provides a data transformation layer that is used by the analytic applications environment to process a received transactional data associated with the tenant and load a transformed data into the data warehouse;
wherein the analytic applications environment provides a semantic layer that includes data defining a semantic model of the tenant's data including:
a physical layer that maps to a physical data model;
a logical layer that operates as a mapping and transformation layer where calculations can be defined; and
a presentation layer that enables access to the data as content;
generating automatically, by a semantic model extension process, one or more data maps associated with the tenant's source data environment, by reference to a combination of:
a seed repository that includes curated artifacts including basic dimensions associated with the source data environment, and
automatically-determined or interpreted variables provided by a data introspection of the source data environment and an associated source model;
said process comprising:
generating or updating the semantic model of the tenant's data for transaction types associated with the tenant's source data environment, including determining, based on the introspection of the source data environment, dimensions and facts associated with the source data to include in the semantic model; and
overlaying the generated semantic model with security artifacts corresponding to those described in the source model that control data visibility.

16. The non-transitory computer readable storage medium of claim 15, further comprising performing an extract, transform, load data pipeline or process in accordance with the analytic applications schema and the customer schema associated with the tenant, to receive data from the tenant's enterprise software application or source data environment, for loading into the data warehouse instance associated with the tenant.

17. The non-transitory computer readable storage medium of claim 15, wherein generation of one or more extract, transform, load (ETL) maps includes receiving from the seed repository the curated artifacts, including basic dimensions associated with the source data environment; and
wherein additional transaction dimensions, columns, or security artifacts, are then automatically generated by the generator framework.

18. The non-transitory computer readable storage medium of claim 15, wherein the semantic model as generated is stored as a business intelligence (BI) Repository (RPD) file.

19. The non-transitory computer readable storage medium of claim 15, wherein the source data environment is one of a NetSuite, business intelligence (BI), enterprise resource planning (ERP), cloud computing, enterprise computing, or other computing environment.

20. The non-transitory computer readable storage medium of claim 15, wherein the data warehouse is associated with an analytic applications schema;
wherein each tenant instance of the data warehouse is populated with data received from an enterprise software application or source data environment, wherein data associated with a particular tenant of the analytic applications environment is provisioned in the data warehouse instance associated with, and accessible to, the particular tenant, in accordance with the analytic applications schema and the customer schema associated with the particular tenant;
wherein a first customer tenancy for a first tenant comprises a first data warehouse instance, and a second customer tenancy for a second tenant comprises a second data warehouse instance.

* * * * *

UNITED STATES PATENT AND TRADEMARK OFFICE
CERTIFICATE OF CORRECTION

| | | |
|---|---|---|
| PATENT NO. | : 12,265,546 B2 | Page 1 of 1 |
| APPLICATION NO. | : 17/180385 | |
| DATED | : April 1, 2025 | |
| INVENTOR(S) | : Verma et al. | |

It is certified that error appears in the above-identified patent and that said Letters Patent is hereby corrected as shown below:

In the Drawings

On sheet 17 of 32, in FIGURE 17, under reference numeral 408, Line 7, delete "mapping" and insert -- mapping) --, therefor.

In the Claims

In Column 25, Line 19, in Claim 1, after "to" insert -- a --, therefor.

In Column 25, Line 25, in Claim 1, after "by" delete "a data".

In Column 26, Line 51, in Claim 8, after "by" delete "a data".

In Column 28, Line 15, in Claim 15, after "by" delete "a data".

Signed and Sealed this
Twenty-fourth Day of June, 2025

Coke Morgan Stewart
*Acting Director of the United States Patent and Trademark Office*